United States Patent
Taninaka et al.

(10) Patent No.: US 10,545,576 B2
(45) Date of Patent: Jan. 28, 2020

(54) ELECTRONIC DEVICE AND DRIVE CONTROL METHOD THEREOF

(71) Applicant: FUJITSU LIMITED, Kawasaki-shi, Kanagawa (JP)

(72) Inventors: Kiyoshi Taninaka, Ebina (JP); Yuichi Kamata, Isehara (JP); Yasuhiro Endo, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 37 days.

(21) Appl. No.: 16/026,789

(22) Filed: Jul. 3, 2018

(65) Prior Publication Data

US 2018/0329499 A1 Nov. 15, 2018

Related U.S. Application Data

(63) Continuation of application No. PCT/JP2016/050395, filed on Jan. 7, 2016.

(51) Int. Cl.
| | |
|---|---|
| *G06F 3/041* | (2006.01) |
| *G06F 3/01* | (2006.01) |
| *G06F 3/044* | (2006.01) |

(52) U.S. Cl.
CPC .............. *G06F 3/016* (2013.01); *G06F 3/044* (2013.01); *G06F 3/0412* (2013.01)

(58) Field of Classification Search
CPC ...... G06F 3/016; G06F 3/04886; G06F 3/044; G06F 3/0412

See application file for complete search history.

(56) References Cited

U.S. PATENT DOCUMENTS

| | | | |
|---|---|---|---|
| 2012/0268412 A1 | 10/2012 | Cruz-Hernandez et al. | |
| 2014/0118127 A1 | 5/2014 | Levesque et al. | |
| 2015/0070261 A1 | 3/2015 | Jamal et al. | |

FOREIGN PATENT DOCUMENTS

| | | |
|---|---|---|
| JP | 2007-333522 A | 12/2007 |
| JP | 2012-064095 | 3/2012 |

(Continued)

OTHER PUBLICATIONS

International Search Report of Int. Appl. No. PCT/JP2016/050395 dated Feb. 9, 2016.

(Continued)

*Primary Examiner* — Towfiq Elahi
(74) *Attorney, Agent, or Firm* — Maschoff Brennan

(57) ABSTRACT

An electronic device can provide a satisfactory tactile sensation by Fourier-transforming a first image including brightness information, to obtain a first spatial-frequency distribution of the brightness, obtaining a second spatial-frequency distribution by multiplying the first spatial-frequency distribution by a coefficient depending on the first image size, obtaining a first time-frequency distribution based on the second spatial-frequency distribution and an input operation speed, filtering the first time-frequency distribution through a filter in which the transmittance for a frequency band detectable by Pacini's corpuscles is reduced, to obtain a second time-frequency distribution, converting the second time-frequency distribution into a third spatial-frequency distribution, based on the coefficient and the predetermined speed, inverse-Fourier-transforming the third spatial-frequency distribution, to obtain a second image, and driving a vibration element by a drive signal that has an amplitude according to brightness of the second image at the input position.

7 Claims, 21 Drawing Sheets

(56) References Cited

FOREIGN PATENT DOCUMENTS

| JP | 2012-146220 A | 8/2012 |
|---|---|---|
| JP | 2012-243189 A | 12/2012 |
| JP | 2014-512619 A | 5/2014 |
| JP | 2014-112357 A | 6/2014 |
| JP | 2015053038 A | 3/2015 |
| WO | 2011043292 A1 | 4/2011 |

OTHER PUBLICATIONS

Takeyuki Dohda et al., "The Printed-matter Typecasting Method for Haptic Feel Design and Sticky-band Illusion", The collection of papers of the 11th SICE system integration division annual conference (SI2010, Sendai), Dec. 2010, pp. 174 to 177, Abstract.

Masashi Nakatani et al., "The Fishbone Tactile Illusion", Collection of papers of the 10th Congress of the Virtual Reality Society of Japan, Sep. 2005.

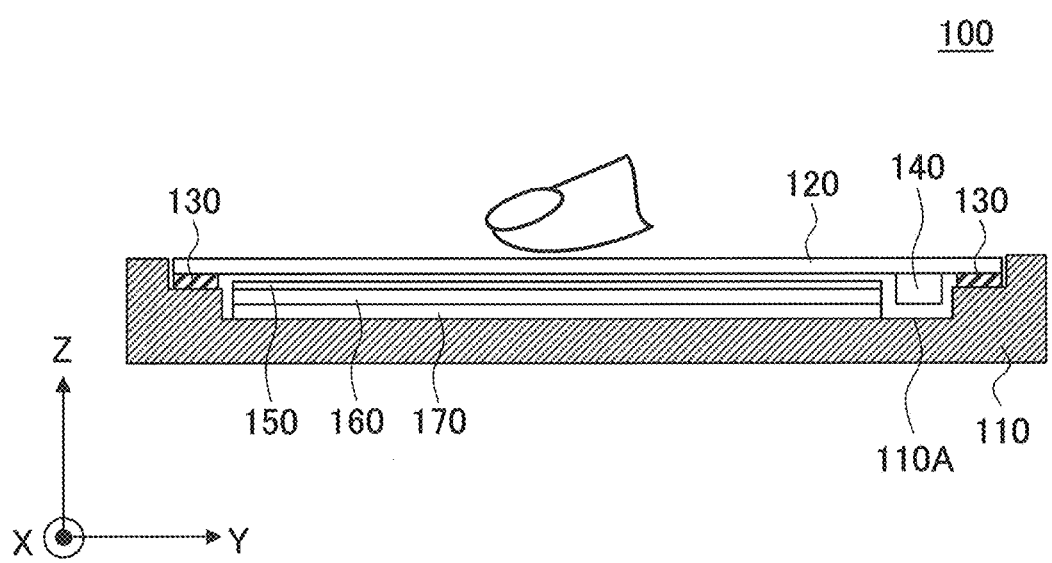

FIG.9

| PROCESSED IMAGE ID | SPEED DATA | BRIGHTNESS DATA |
|---|---|---|
| Image 001 | V1 | BR11(X, Y) |
| Image 001 | V2 | BR12(X, Y) |
| Image 001 | V3 | BR13(X, Y) |
| Image 001 | V4 | BR14(X, Y) |
| Image 001 | V5 | BR15(X, Y) |
| Image 001 | V6 | BR16(X, Y) |
| Image 002 | V1 | BR11(X, Y) |
| ⋮ | ⋮ | ⋮ |

α uc [Hz]

α vc [Hz]

u [CYCLES/pixel]

v [CYCLES/pixel]

c=0.03 m/s c=0.01 m/s c=0.005 m/s c=0.17 m/s c=0.1 m/s c=0.06 m/s

FIG.20
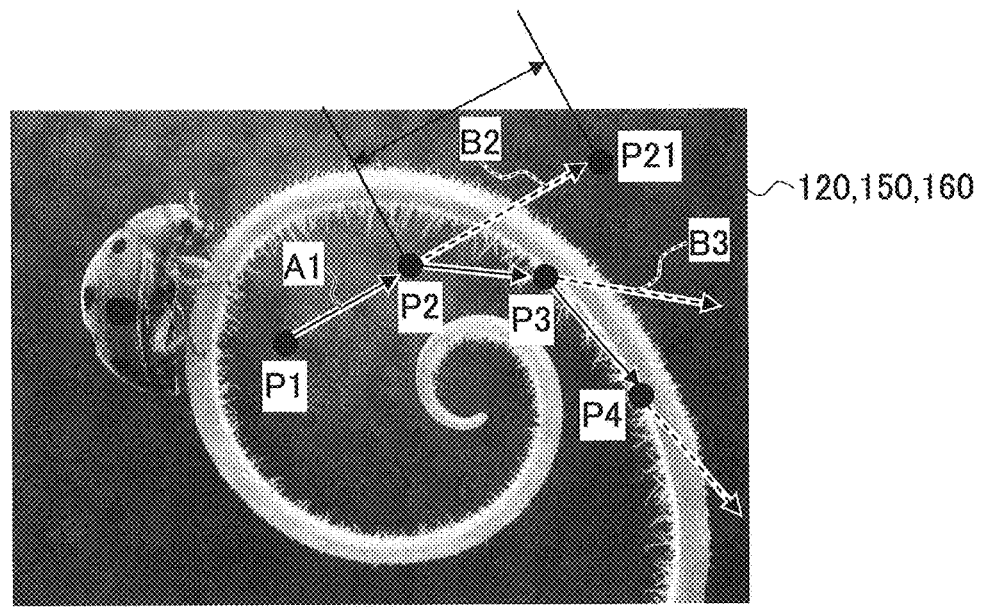
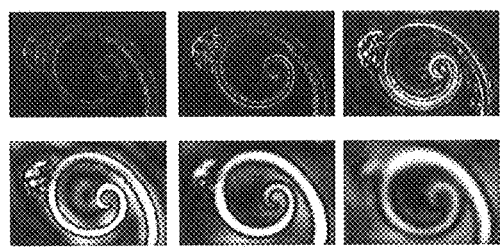
FIG.21A
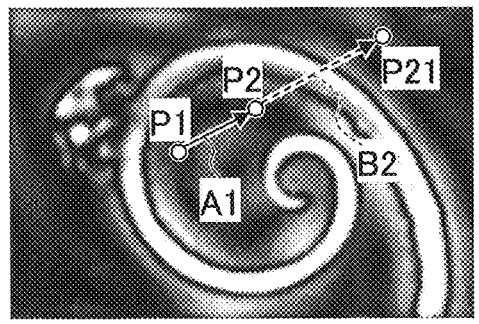
FIG.21B c=0.01 m/s

ELECTRONIC DEVICE AND DRIVE CONTROL METHOD THEREOF

CROSS-REFERENCE TO RELATED APPLICATIONS

This application is a continuation application of International Application PCT/JP2016/050395 filed on Jan. 7, 2016, and designated the U.S., the entire contents of which are incorporated herein by reference.

FIELD

The present disclosure relates to an electronic device, and a drive control method of the electronic device.

BACKGROUND

Conventionally, there has been a haptic effect enabled device that includes a haptic output device; a drive module configured to generate a periodic drive signal based on contacting input on a surface and a tactile sensation on the surface; and an interface unit equipped with a drive circuit that is connected to be operational with the drive module and the haptic output device, and is configured to apply a periodic drive signal to the haptic output device (see, for example, Japanese Laid-Open Patent Publication No. 2014-112357).

Meanwhile, such a haptic effect enabled device does not take into account characteristics of sensory organs of the human being such as the skin, with which unevenness of a shape or vibration of a touched object can be sensed, and hence, may not be capable of providing a satisfactory tactile sensation.

SUMMARY

According to an embodiment, an electronic device includes a display; a top panel placed on a display surface of the display, and including an operation surface; a vibration element configured to generate a vibration on the operation surface; a position detector configured to detect a position of an input operation performed on the operation surface; a memory; and a processor configured to execute applying a Fourier transform to a first image that includes brightness information, to obtain a first distribution of spatial frequencies of brightness of the first image, obtaining a second distribution of the spatial frequencies of the brightness by multiplying the first distribution of the spatial frequencies of the brightness by a coefficient depending on a display size of the first image, obtaining a first distribution of time frequencies of the brightness based on the second distribution of the spatial frequencies of the brightness, and a predetermined speed of the input operation, filtering the first distribution of the time frequencies of the brightness through a filter having a transmission band characteristic in which a transmission degree of the brightness in a frequency band detectable by Pacini's corpuscles is reduced to a predetermined degree, to obtain a second distribution of the time frequencies of the brightness, converting the second distribution of the time frequencies of the brightness into a third distribution of the spatial frequencies of the brightness, based on the coefficient and the predetermined speed, applying an inverse Fourier transform to the third distribution of the spatial frequencies of the brightness, to obtain a second image, and driving the vibration element by a drive signal that has an amplitude according to brightness of the second image corresponding to a position of the input operation detected by the position detector.

The object and advantages in the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 3 is a cross-sectional view of the electronic device along a line designated with arrows A-A in FIG. 2;

FIG. 9 is a diagram illustrating brightness data stored in a memory;

FIG. 20 is a diagram illustrating a process of a drive controller;

FIGS. 21A-21B are diagrams illustrating a process of extracting brightness from a processed image;

DESCRIPTION OF EMBODIMENTS

In the following, embodiments of an electronic device and a drive control method of the electronic device will be described.

According to an embodiment, it is possible to provide an electronic device that is capable of providing a satisfactory tactile sensation, and a drive control method of the electronic device.

First Embodiment

Figure 1:
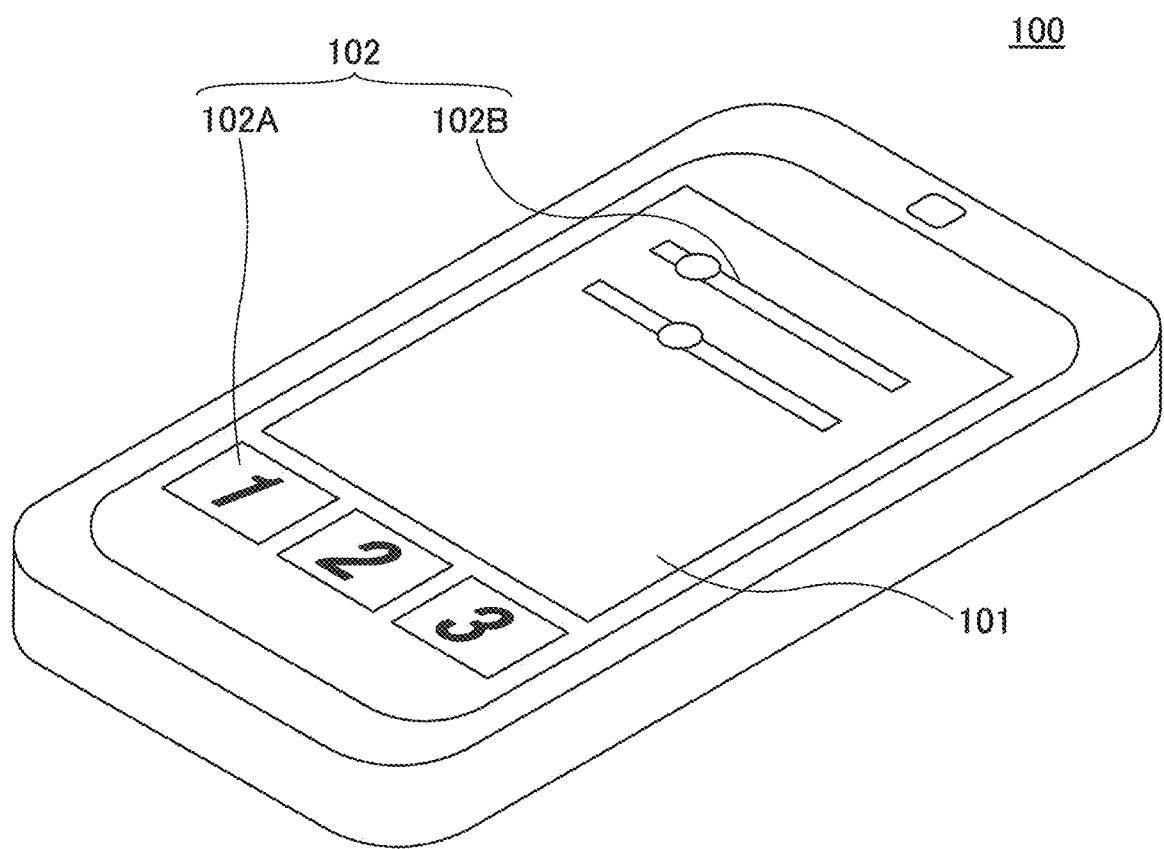
FIG. 1 is a perspective view illustrating an electronic device in an embodiment.

FIG. 1 is a perspective view illustrating an electronic device 100 in a first embodiment.

The electronic device 100 is a smart phone or a tablet computer that includes, for example, a touch panel as an input operation part. Since the electronic device 100 simply needs to be a device that includes a touch panel as an input operation part, it may be, for example, a mobile information terminal or a device that is installed and used in a specific place, such as an ATM (Automatic Teller Machine).

An input operation part 101 of the electronic device 100 has a display panel placed under a touch panel, on which various buttons 102A, sliders 102B, and the like (referred to as a GUI operation part 102, below) of GUI (Graphic User Interface) are displayed.

Normally, the user of the electronic device 100 touches the input operation part 101 with a fingertip in order to operate the GUI operation part 102.

Next, by using FIG. 2, a specific configuration of the electronic device 100 will be described.

Figure 2:
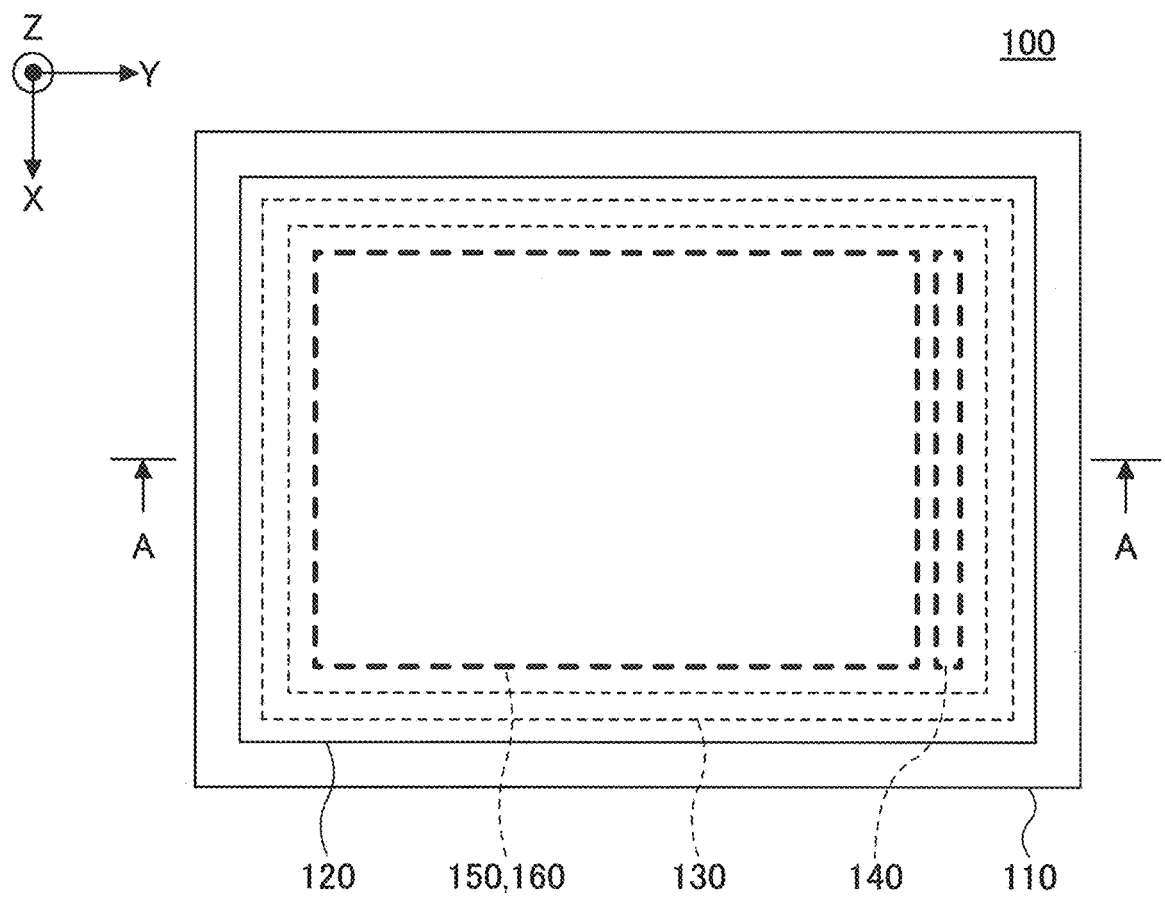
FIG. 2 is a plan view illustrating an electronic device in an embodiment.

FIG. 2 is a plan view illustrating the electronic device 100 in the first embodiment, and FIG. 3 is a cross-sectional view of the electronic device 10 along a line designated with arrows A-A in FIG. 2. Note that in FIG. 2 and FIG. 3, an XYZ coordinate system is defined as an orthogonal coordinate system as illustrated.

The electronic device 100 includes a housing 110, a top panel 120, a double-sided tape 130, a vibration element 140, a touch panel 150, a display panel 160, and a substrate 170.

The housing 110 is made of, for example, resin, and as illustrated in FIG. 3, has the substrate 170, the display panel 160, and the touch panel 150 placed in a depressed portion 110A, on which the top panel 120 is adhered by the double-sided tape 130.

The top panel 120 is a thin, plate-shaped member that is rectangular in plan view, and is made of a transparent glass or a reinforced plastic such as polycarbonate. The surface of the top panel 120 (a surface on the side in the positive direction of the Z-axis) is an example of an operation surface on which the user of the electronic device 100 performs an input operation.

The top panel 120 has the vibration element 140 adhered on a surface on the side in the negative direction of the Z-axis, and has four sides in plan view adhered to the housing 110 with the double-sided tape 130. Note that the double-sided tape 130 simply needs to be capable of gluing the four sides of the top panel 120 to the housing 110, and does not need to be rectangular and toroidal as illustrated in FIG. 3.

The touch panel 150 is placed on the side in the negative direction of the Z-axis of the top panel 120. The top panel 120 is provided in order to protect the surface of the touch panel 150. Note that another panel, a protective film, or the like may be provided on the surface of the top panel 120.

In a state where the vibration element 140 is adhered to the surface on the side in the negative direction of the Z-axis, the top panel 120 vibrates when the vibration element 140 is driven. In the first embodiment, the top panel 120 is vibrated with the natural vibration frequency of the top panel 120, to generate a standing wave on the top panel 120. However, in practice, since the vibration element 140 is adhered to the top panel 120, it is desirable to determine the natural vibration frequency taking the weight of the vibration element 140 and the like into consideration.

On a surface of the top panel 120 on the side in the negative direction of the Z-axis, the vibration element 140 is adhered along the short side that extends in the X-axis direction on the side in the positive direction of the Y-axis. The vibration element 140 simply needs to be an element that can generate vibration in an ultrasonic range, for example, a device including a piezo-electric element may be used.

The vibration element 140 is driven by a drive signal output from a drive controller, which will be described later. The amplitude (strength) and the frequency of a vibration generated by the vibration element 140 are set by the drive signal. Also, the drive signal controls turning on and off the vibration element 140.

Note that the ultrasonic range here means a frequency band of, for example, approximately over 20 kHz. In the electronic device 100 in the first embodiment, since the frequency at which the vibration element 140 vibrates is equivalent to the vibration frequency of the top panel 120, the vibration element 140 is driven by the drive signal so as to vibrate at the natural frequency of the top panel 120.

The touch panel 150 is placed above the display panel 160 (on the side in the positive direction of the Z-axis) and under the top panel 120 (on the side in the negative direction of the Z-axis). The touch panel 150 is an example of a coordinate detector to detect a position at which the user of the electronic device 100 touches the top panel 120 (referred to as the position of an input operation, below).

Various buttons and the like of the GUI (referred to as GUI operation parts, below) are displayed on the display panel 160 under the touch panel 150. Therefore, the user of the electronic device 100 normally touches the top panel 120 with a fingertip, in order to operate a GUI operation part.

The touch panel 150 simply needs to be a coordinate detector that can detect the position of an input operation performed by the user on the top panel 120, and may be a coordinate detector of, for example, an electrostatic capacitance type or a resistance film type. Here, the embodiment will be described with the touch panel 150 being a coordinate detector of an electrostatic capacitance type. Even if a space lies between the touch panel 150 and the top panel 120, the electrostatic-capacitance-type touch panel 150 can detect an input operation on the top panel 120.

Also, although the embodiment will be described here in which the top panel 120 is placed on the input surface side of the touch panel 150, the top panel 120 may be uniformly formed with the touch panel 150. In this case, the surface of the touch panel 150 corresponds to the surface of the top panel 120 illustrated in FIG. 2 and FIG. 3, which constitutes the operation surface. Also, a configuration is possible in which the top panel 120 illustrated in FIG. 2 and FIG. 3 is omitted. Also in this case, the surface of the touch panel 150 constitutes the operation surface. Also, in either case, it is simply necessary to vibrate the member having the operation surface at the natural vibration of the member.

Also, in the case of the touch panel 150 being an electrostatic capacitance type, the touch panel 150 may be placed above the top panel 120. Also in this case, the surface of the touch panel 150 constitutes the operation surface. Also, in the case of the touch panel 150 being an electrostatic capacitance type, a configuration is possible in which the top panel 120 illustrated in FIG. 2 and FIG. 3 is omitted. Also in this case, the surface of the touch panel 150 constitutes the operation surface. Also, in either case, it is simply necessary to vibrate the member having the operation surface at the natural vibration of the member.

The display panel 160 simply needs to be a display that can display an image, for example, a liquid crystal display panel or an organic EL (Electroluminescence) panel. The display panel 160 is installed in the depressed portion 110A of the housing 110, and on the substrate 170 (on the side in the positive direction of the Z-axis) with a holder or the like (not illustrated).

The display panel 160 is driven and controlled by a driver IC (Integrated Circuit), which will be described later, to display GUI operation parts, images, characters, marks, figures, and the like depending on an operational state of the electronic device 100.

The substrate 170 is placed on the inside of the depressed portion 110A of the housing 110. On the substrate 170, the display panel 160 and the touch panel 150 are placed. The display panel 160 and the touch panel 150 are fixed to the substrate 170 and the housing 110 with a holder and the like (not illustrated).

The substrate 170 mounts a drive controller, which will be described later, and in addition, various circuits and the like that are necessary to drive the electronic device 100.

When the user touches the top panel 120 with a finger, and a movement of the fingertip is detected, the electronic device 100 configured as above causes the drive controller mounted on the substrate 170 to drive the vibration element 140, so as to vibrate the top panel 120 at a frequency in the ultrasonic range. This frequency in the ultrasonic range is a resonance frequency of a resonance system including the top panel 120 and the vibration element 140, and generates a standing wave on the top panel 120.

The electronic device 100 provides the user with a tactile sensation through the top panel 120 by generating the standing wave in the ultrasonic range.

Next, by using FIG. 4, a standing wave generated on the top panel 120 will be described.

Figures 4A, 4B:
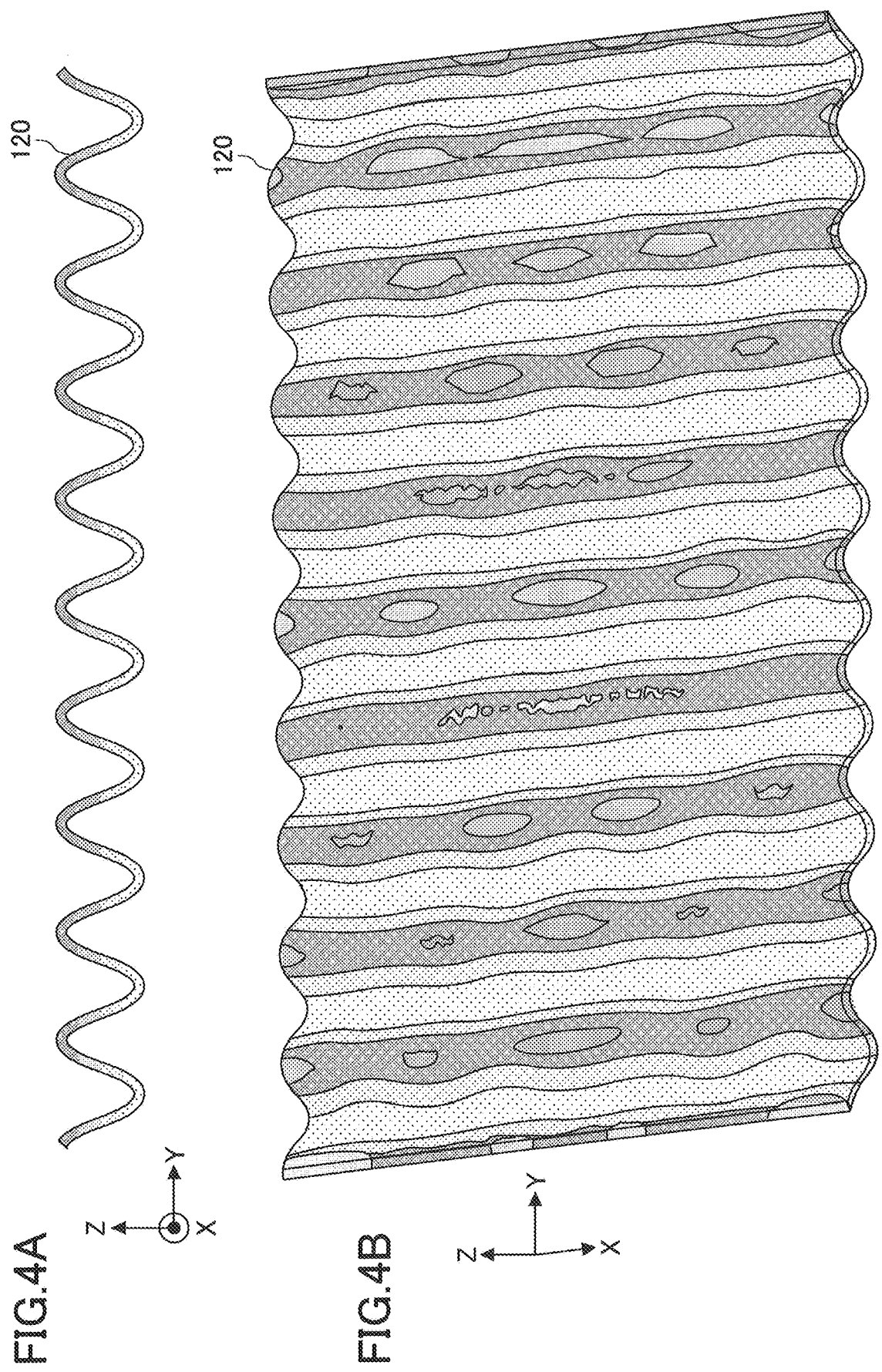
FIGS. 4A-4B are diagrams illustrating a wave crest formed in parallel with a short side of a top panel 120 among standing waves generated on a top panel by natural vibration in an ultrasonic range.

FIGS. 4A-4B are diagrams illustrating a wave crest formed in parallel with a short side of the top panel 120 among standing waves generated on the top panel 120 by natural vibration in the ultrasonic range; FIG. 4A is a side view and FIG. 4B is a perspective view. In FIGS. 4A-4B, XYZ coordinates are defined similarly as in FIG. 2 and FIG. 3. Note that the amplitude of the standing wave is exaggerated in FIGS. 4A-4B for the sake of understandability. Also, in FIGS. 4A-4B, the vibration element 140 is not illustrated.

By using the Young's modulus E, the density ρ, the Poisson ratio δ, the long side dimension 1, and the thickness t of the top panel 120, and the number of cycles k of the standing wave that exist in the direction of the long side, the natural frequency (resonance frequency) f of the top panel 120 is represented by the following Expressions (1) and (2). Since the same waveform appears in a standing wave in the units of ½ cycles, the number of cycles k takes a value in the units of 0.5, which may be 0.5, 1, 1.5, 2, and so on.

$$f = \frac{\pi k^2 t}{l^2} \sqrt{\frac{E}{3\rho(1-\delta^2)}} \quad (1)$$

$$f = \beta k^2 \quad (2)$$

Note that the coefficient β in Expression (2) collectively represents coefficients other than $k^2$ in Expression (1).

The standing wave illustrated in FIGS. 4A-4B is a waveform in the case of the number of cycles k being, for example, 10. For example, as the top panel 120, in the case of using a Gorilla glass (registered trademark) having the long-side length l of 140 mm, the short-side length of 80 mm, and the thickness t of 0.7 mm, the natural frequency f turns out to be 33.5 kHz in the case of the number of cycles k being 10. In this case, it is simply necessary to use the drive signal having the frequency of 33.5 kHz.

Although the top panel 120 is a plate-shaped member, when the vibration element 140 (see FIG. 2 and FIG. 3) is driven to generate the natural vibration in the ultrasonic range, the top panel 120 is bent to generate a standing wave on the surface as illustrated in FIGS. 4A-4B.

Note that although in the embodiment described here, a single vibration element 140 is adhered along the short side that extends in the X-axis direction on the side in the positive direction of the Y-axis on the surface of the top panel 120 on the side in the negative direction of the Z-axis, two vibration elements 140 may be used. In the case of using two vibration elements 140, the other vibration element 140 may be adhered along the short side that extends in the X-axis direction on the side in the negative direction of the Y-axis on the surface of the top panel 120 on the side in the negative direction of the Z-axis. In this case, the two vibration elements 140 may be placed to be axially symmetric with respect to the central line parallel to the two short sides of the top panel 120 as the axis of symmetry.

Also, in the case of driving two vibration elements 140, the elements are driven in phase if the number of cycles k is an integer, or driven in reverse phase if the number of cycles k is a fraction (a number including an integer part and a fractional part).

Next, by using FIG. 5, natural vibration in the ultrasonic range will be described, which is generated on the top panel 120 of the electronic device 100.

Figure 5B:
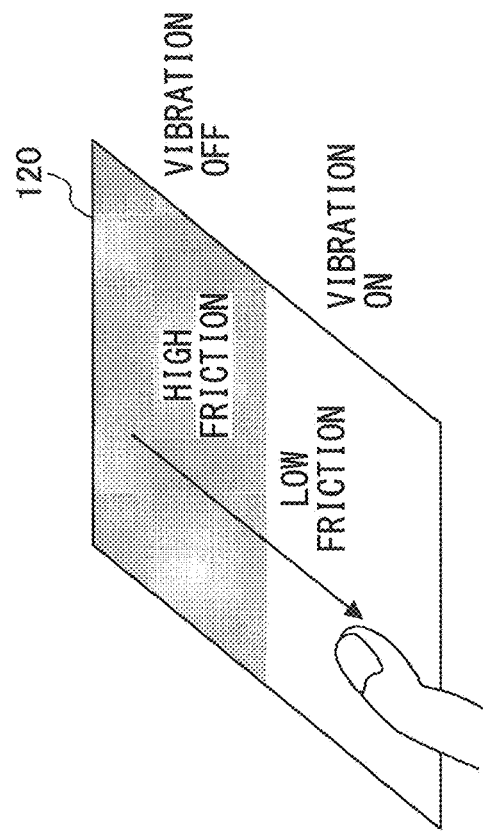
FIGS. 5A-5B are diagrams illustrating how dynamic frictional force acting on a fingertip performing an input operation changes with natural vibration in an ultrasonic range generated on a top panel of an electronic device.
Figure 5A:
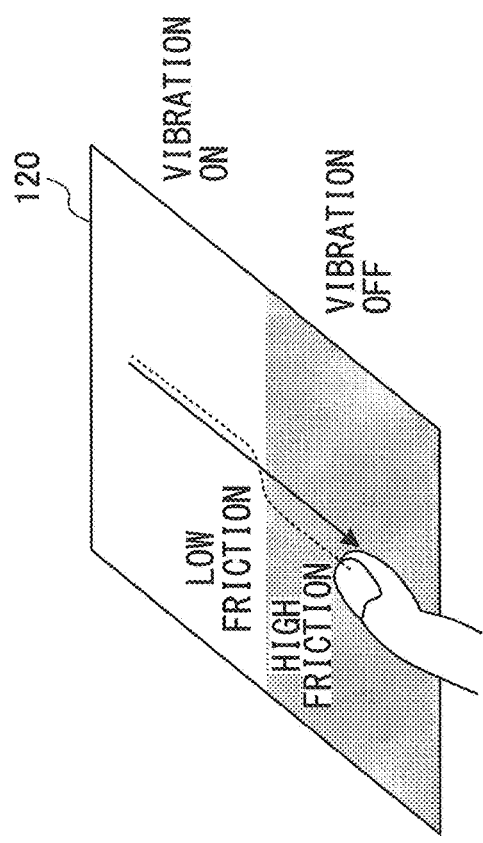

FIGS. 5A-5B are diagrams illustrating how dynamic frictional force acting on a fingertip performing an input operation changes with the natural vibration in the ultrasonic range generated on the top panel 120 of the electronic device 100. In FIGS. 5A-5B, the user is performing an input operation by moving a finger from the far side to the closer side of the top panel 120 while touching the top panel 120 with the fingertip. Note that a vibration is turned on and off by turning on and off the vibration element 140 (see FIG. 2 and FIG. 3).

Also, in FIGS. 5A-5B, along the depth direction of the top panel 120, a range touched with a finger while vibration is turned off is illustrated in gray, and a range touched with the finger while vibration is turned on is illustrated in white.

The natural vibration in the ultrasonic range is generated on the entire top panel 120 as illustrated in FIGS. 4A-4B, which may be turned on and off; FIGS. 5A-5B illustrate operational patterns in which vibration is switched between on and off while the user moves the finger from the far side to the closer side of the top panel 120.

To clarify this, in FIGS. 5A-5B, along the depth direction of the top panel 120, the range touched with the finger while vibration is turned off is illustrated in gray, and the range touched with the finger while vibration is turned on is illustrated in white.

In the operational pattern illustrated in FIG. 5A, vibration is turned off when the user's finger is located in the far side of the top panel 120, and vibration is turned on during the course of moving the finger to the closer side.

On the other hand, in the operational pattern illustrated in FIG. 5B, vibration is turned on when the user's finger is located in the far side of the top panel 120, and vibration is turned off during the course of moving the finger to the closer side.

Here, when the top panel 120 is caused to generate the natural vibration in the ultrasonic range, the squeeze film effect generates an air layer between the surface of the top panel 120 and a finger, and the dynamic friction coefficient decreases when the surface of the top panel 120 is traced with the finger.

Therefore, in FIG. 5A, in the range on the far side of the top panel 120 illustrated in gray, the dynamic frictional force acting on the fingertip is greater, and the dynamic frictional force acting on the fingertip becomes smaller in the range on the closer side of the top panel 120 illustrated in white.

Therefore, as illustrated in FIG. 5A, once the vibration is turned on, the user who performs an input operation on the top panel 120 senses that the dynamic frictional force acting on the fingertip declines, and perceives that it has become easier to slide the fingertip. At this moment, a smoother surface of the top panel 120 and a declining dynamic frictional force cause the user to feel as if a concavity existed on the surface of the top panel 120.

On the other hand, in FIG. 5B, in the range on the far side of the top panel 120 illustrated in white, the dynamic frictional force acting on the fingertip is smaller, and the dynamic frictional force acting on the fingertip becomes greater in the range on the closer side of the top panel 120 illustrated in gray.

Therefore, as illustrated in FIG. 5B, once the vibration is turned off, the user who performs an input operation on the top panel 120 senses that the dynamic frictional force acting on the fingertip increases, and perceives difficulty in sliding the fingertip or a sense of being stopped. Then, such difficulty in sliding the fingertip and an increasing dynamic frictional force cause the user to feel as if a convexity existed on the surface of the top panel 120.

As described above, in the cases of FIGS. 5A-5B, the user can sense a convexity or a concavity with a fingertip. Such a capability of the human being to sense a convexity or a concavity is described in, for example, "Printed-matter Typecasting Method for Haptic Feel Design and Sticky-band Illusion" in Proceedings of the eleventh lecture meeting held by the system integration division of the Society of Instrument and Control Engineers (SI2010 in Sendai), pp. 174-177, December 2010. See also the description in "Fishbone Tactile Illusion" in Proceedings of the tenth convention of the Virtual Reality Society of Japan, September 2005.

Note that although it has been described here change of the dynamic frictional force in the case of switching on and off a vibration, the same is applied to the case where the amplitude (strength) of the vibration element 140 is changed.

Figure 6:
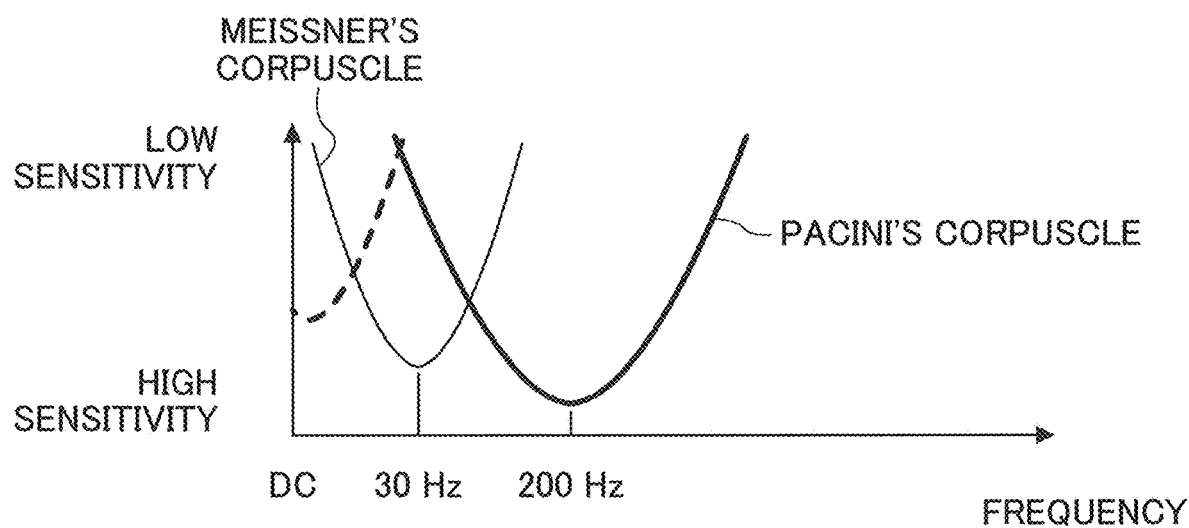
FIG. 6 is a diagram illustrating a relationship between a tactile sensation detected by sensory organs of the human being such as the skin, and a frequency band.

FIG. 6 is a diagram illustrating a relationship between a tactile sensation detected by sensory organs of the human being such as the skin, and a frequency band. In FIG. 6, the horizontal axis represents the frequency and the vertical axis represents the sensitivity of sensory organs. A lower level in the vertical axis represents that the sensitivity is higher in detecting a tactile sensation (higher sensitivity), and a higher level in the vertical axis represents that the sensitivity is lower in detecting a tactile sensation (lower sensitivity).

FIG. 6 illustrates frequency bands of a Meissner's corpuscle and a Pacini's corpuscle to detect a tactile sensation. The Meissner's corpuscle and Pacini's corpuscle are sensory organs that exist in the skin of the human being to detect a tactile sensation; a tactile sensation felt by the human being on the skin is mainly detected by Meissner's corpuscles and Pacini's corpuscles.

The Meissner's corpuscle has a characteristic of the sensitivity to detect a tactile sensation in a band less than or equal to 100 Hz, and has the peak sensitivity around 30 Hz. Meanwhile, the Pacini's corpuscle has a characteristic of the sensitivity to detect a tactile sensation in a band ranging from approximately 30 Hz to approximately 500 Hz, and has the peak sensitivity around 200 Hz. Also, the Pacini's corpuscle has a higher sensitivity than the Meissner's corpuscle.

Therefore, a tactile sensation felt on the skin of the human being when the skin touches an object or the like is dominantly detected by Pacini's corpuscles, which tends to sense a vibration around 200 Hz most strongly. That is, when a fingertip touches the top panel 120 driven by the vibration element 140 to vibrate, a vibration around 200 Hz is detected most strongly.

In other words, a most strongly detected vibration around 200 Hz may hide, for example, a vibration around 100 Hz or less from detection by Meissner's corpuscles or a vibration in a frequency band other than around 200 Hz from detection by Pacini's corpuscles, and makes such vibrations hard to be sensed.

Due to such a tendency, for example, even if the frequency, the amplitude, or the like of a vibration is adjusted in order to improve a tactile sensation felt by the human being, a tactile sensation may not be sufficiently improved.

Thereupon, when generating a drive signal to drive the vibration element 140 depending on an image displayed on the display panel 160, the electronic device 100 in the first embodiment uses a filter that reduces the amplitude in a frequency band detectable by Pacini's corpuscles to a certain extent.

Driving the vibration element 140 by a drive signal whose amplitude is adjusted by using such a filter enables a human being to detect a vibration of various frequencies or amplitudes more easily, and to improve the tactile sensation.

Next, by using FIG. 7, the characteristic of a filter as described above will be described.

Figure 7:
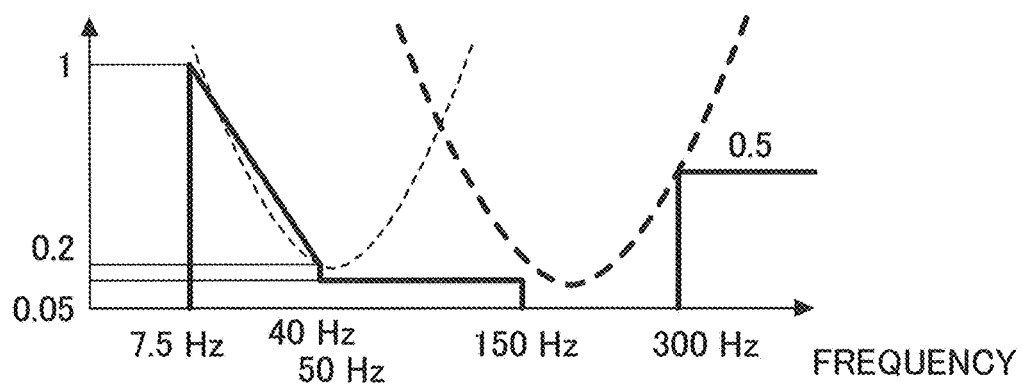
FIG. 7 is a diagram illustrating a transmission band of a filter used when generating a drive signal by an electronic device in a first embodiment.

FIG. 7 is a diagram illustrating a transmission band of a filter used when generating a drive signal by the electronic device 100 in the first embodiment. In FIG. 7, the horizontal axis represents the frequency and the vertical axis represents the transmittance. FIG. 7 also illustrates frequency bands in which the Meissner's corpuscle and the Pacini's corpuscle detect a tactile sensation. The curves of the Meissner's corpuscle and the Pacini's corpuscle are positioned in the vertical axis direction so as to indicate where the respective frequency bands are located irrespective of the transmittance.

As illustrated in FIG. 7, this filter has a characteristic of the transmittance that decreases linearly from 1 to 0.2 from 7.5 Hz to 40 Hz, decreases linearly from 0.2 to 0.05 from 40 Hz to 50 Hz, and is fixed to 0.05 from 50 Hz to 150 Hz. Also, the transmittance is zero (0) from 150 Hz to 300 Hz, and is fixed to a constant value of 0.5 at 300 Hz or higher.

In this way, the transmittance is reduced to zero (0) between 150 Hz and 300 Hz around 200 Hz, and is fixed to 0.05 between 50 Hz and 150 Hz. Such a characteristic of the filter enables to prevent a tactile sensation detected by Pacini's corpuscles from becoming dominant.

Also, the transmittance linearly decreasing from 1 to 0.2 from 7.5 Hz to 40 Hz improves the balance on the lower frequency side in the frequency band detectable by Meissner's corpuscles.

Furthermore, the characteristic of the transmittance rising to 0.5 at 300 Hz makes it easier to sense a tactile sensation caused by a high frequency. A tactile sensation caused by a high frequency is, for example, a tactile sensation perceived by a human being when touching something relatively sharp such as a corner of an object.

Note that providing a tactile sensation caused by an extremely low frequency is not easy compared with providing a tactile sensation caused by a relatively high frequency; thus, the transmittance is set to zero (0) in the frequency band less than or equal to 7.5 Hz.

The electronic device 100 in the first embodiment processes an image (an original image) displayed on the display panel 160 by using a filter that has a transmission band characteristic as illustrated in FIG. 7. Then, in a state where the original image is displayed on the display panel 160, if an input operation is performed on the top panel 120, based on the brightness obtained at the coordinates of the input operation in an image (a processed image) obtained by processing the original image, the electronic device 100 calculates the amplitude of the drive signal to drive the vibration element 140.

Executing such a process improves a tactile sensation to be provided when the user moves a fingertip while touching the top panel 120 of the electronic device 100.

Note that the transmission band of a filter illustrated in FIG. 7 is merely an example. For example, the transmittance of the frequency band less than or equal to 7.5 Hz may be increased. Also, the values of the transmittance in the frequency band from 7.5 Hz to 300 Hz may be changed. As long as it is possible to prevent a tactile sensation detected by Pacini's corpuscles from becoming dominant, the transmittance may be set to various values. Also, although the transmittance is set to a constant value (0.5) at 300 Hz or higher, the transmittance is not limited to be set to 0.5 at 300 Hz or higher. In order to adjust a tactile sensation to be provided for a fingertip, various values may be set. Also, the transmittance may have a characteristic that increases linearly or nonlinearly over 300 Hz. In this case, the transmittance may increase in accordance with the sensitivity of the Pacini's corpuscle. Also, the transmittance does not need to start increasing from zero (0) at 300 Hz; the starting frequency may be, for example, around 250 Hz, which is lower than 300 Hz, or around 400 Hz, which is higher than 300 Hz.

Next, by using FIG. 8, a configuration of the electronic device 100 in the first embodiment will be described.

Figure 8:
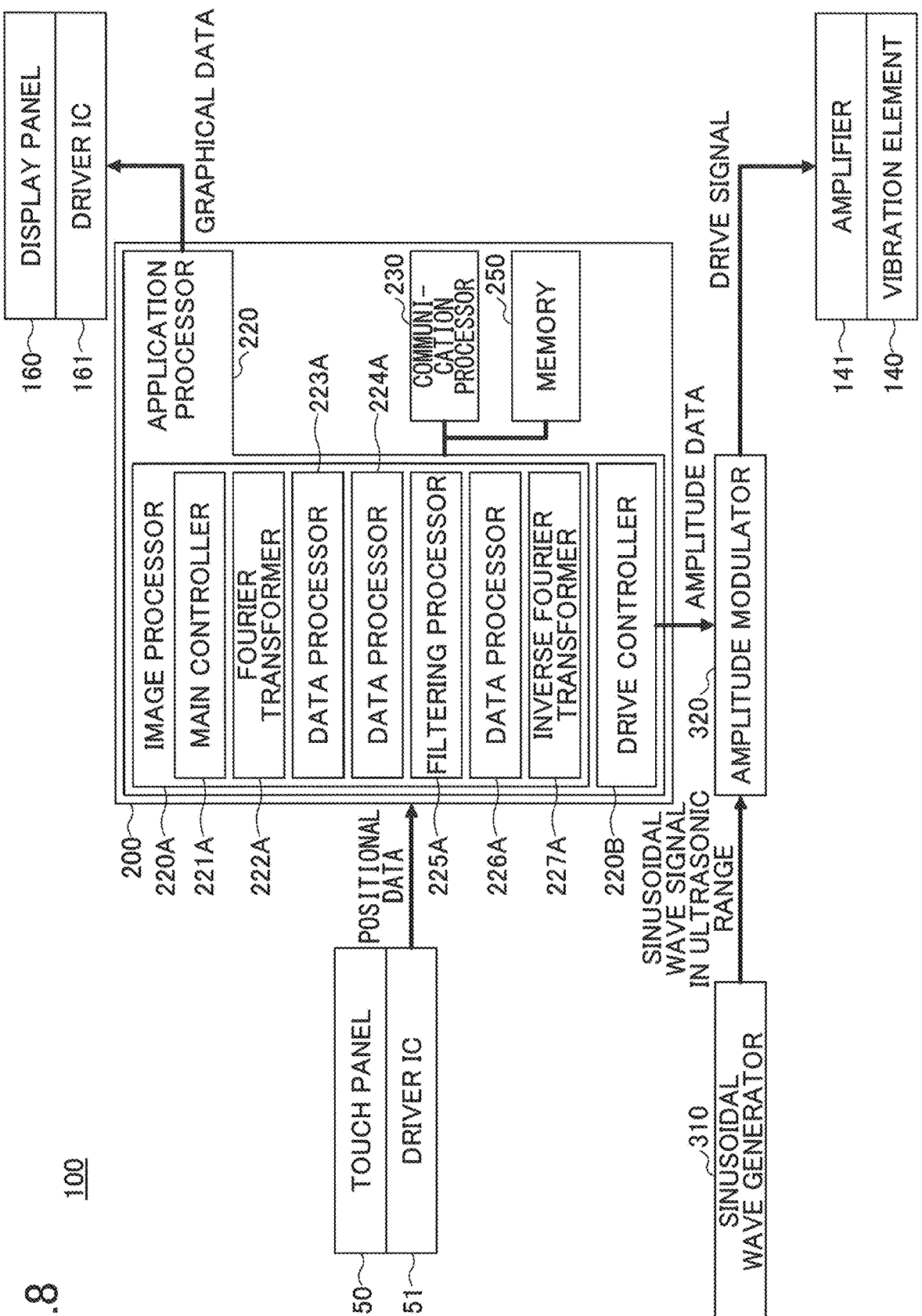
FIG. 8 is a diagram illustrating a configuration of an electronic device in an embodiment.

FIG. 8 is a diagram illustrating a configuration of the electronic device 100 in the first embodiment.

The electronic device 100 includes the vibration element 140, an amplifier 141, the touch panel 150, a driver IC (Integrated Circuit) 151, the display panel 160, a driver IC 161, a controller 200, a sinusoidal wave generator 310, and an amplitude modulator 320.

The controller 200 includes an application processor 220, a communication processor 230, and a memory 250. The controller 200 is implemented with, for example, an IC chip. The application processor 220 includes an image processor 220A and a drive controller 220B.

Note that although the application processor 220, the communication processor 230, and the memory 250 will be described here in a form implemented by the single controller 200, the image processor 220A and the drive controller 220B of the application processor 220 may be provided outside of the controller 200 as separate IC chips or processors. Also, in this case, the image processor 220A and the drive controller 220B may be provided as separate IC chips or processors.

In FIG. 8, the housing 110, the top panel 120, the double-sided tape 130, and the substrate 170 (see FIG. 2) are not illustrated. Here, the amplifier 141, the driver IC 151, the driver IC 161, the application processor 220, the communication processor 230, the memory 250, the sinusoidal wave generator 310, and the amplitude modulator 320 will be described.

The amplifier 141 is placed between the drive controller 220B of the application processor 220 and the vibration element 140, to amplify a drive signal output from the drive controller 220B so as to drive the vibration element 140.

The driver IC 151 is connected to the touch panel 150 to detect positional data representing a position at which an input operation is performed on the touch panel 150, to output the positional data to the controller 200. Consequently, the positional data is input into the application processor 220.

The driver IC 161 is connected to the display panel 160, to input graphical data output from the application processor 220 into the display panel 160 so as to display images based on the graphical data on the display panel 160. Thus, GUI operation parts, images, and the like based on the graphical data are displayed on the display panel 160.

The image processor 220A of the application processor 220 applies a Fourier transform to an original image selected by the user, applies a filtering process to the transformed image, and further applies an inverse Fourier transform to the filtered image, to generate a processed image.

The drive controller 220B of the application processor 220 generates a drive signal by using a processed image generated by the image processor 220A, to drive the vibration element 140.

Also, parts of the application processor 220 other than the image processor 220A and the drive controller 220B execute various applications of the electronic device 100.

The image processor 220A includes a main controller 221A, a Fourier transformer 222A, a data processor 223A, a data processor 224A, a filtering processor 225A, a data processor 226A, and an inverse Fourier transformer 227A.

The image processor 220A applies a Fourier transform to an original image selected by the user, applies a filtering process to the transformed image, and further applies an inverse Fourier transform to the filtered image, to generate a processed image. It will be briefly described here about processes executed by the main controller 221A, the Fourier transformer 222A, the data processor 223A, the data processor 224A, the filtering processor 225A, the data processor 226A, and the inverse Fourier transformer 227A.

The main controller 221A is a processing unit to manage execution of the image processor 220A, which executes, for example, reading an original image selected by the user from the memory 250, and storing the processed image in the memory 250.

The Fourier transformer 222A applies a Fourier transform to an original image that includes brightness information, to obtain a first distribution of spatial frequencies of the brightness of the original image. The original image is an example of a first image.

Based on the first distribution of spatial frequencies of the brightness of the original image, the data processor 223A obtains a second distribution of spatial frequencies of the brightness multiplied by a coefficient according to the display size of the original image. The data processor 223A is an example of a processor configured to execute obtaining a second distribution of spatial frequencies of the brightness.

Based on the second distribution of spatial frequencies of the brightness of the original image, and a predetermined speed of an input operation, the data processor 224A obtains a first distribution of time frequencies of the brightness of the original image. Here, in order to generate first distributions of time frequencies of the brightness of multiple original images on which an input operation may be performed with predetermined different speeds, multiple predetermined speeds of multiple input operations are used. Multiple predetermined speeds of an input operation will be described later. The data processor 224A is an example of a processor configured to execute obtaining a first distribution of time frequencies of the brightness.

The filtering processor 225A provides a filter to be applied to the first distribution of time frequencies of the brightness of the original image obtained by the data processor 224A, to obtain a second distribution of time frequencies of the brightness of the original image through the filter. The filter used by the filtering processor 225A is a filter that has a transmission band characteristic in which the transmission degree of the brightness in the frequency band detectable by Pacini's corpuscles is reduced to a predetermined degree. The filter used by the filtering processor 225A has, for example, the transmission characteristic illustrated in FIG. 7.

Based on a coefficient depending on the display size of the original image used by the data processor 223A, and the predetermined speed of the input operation used by the data processor 224A, the data processor 226A converts the second distribution of time frequencies of the brightness of the original image into a third distribution of spatial frequencies of the brightness of the original image. The data processor 226A is an example of a processor configured to execute converting the second distribution of time frequencies of the brightness into a third distribution of spatial frequencies of the brightness.

The inverse Fourier transformer 227A applies an inverse Fourier transform to the third distribution of spatial frequencies of the brightness of the original image, to generate a processed image. The processed image is an example of a second image.

Note that processes executed by the main controller 221A, the Fourier transformer 222A, the data processor 223A, the data processor 224A, the filtering processor 225A, the data processor 226A, and the inverse Fourier transformer 227A will be described later in detail using FIG. 11 to FIG. 18.

In a state where an original image is displayed on the display panel 160, if an input operation is performed on the top panel 120, based on the brightness of a pixel corresponding to coordinates of the input operation in a processed image, the drive controller 220B obtains an amplitude of the drive signal to drive the vibration element 140.

The drive controller 220B outputs the amplitude data to the amplitude modulator 320, in the case where the positional data representing the position of the input operation is moving. The amplitude data is data representing the amplitude value for adjusting the strength of a drive signal used for driving the vibration element 140. The amplitude value is obtained by multiplying the brightness of a pixel corresponding to coordinates of the input operation in a processed image by a predetermined coefficient.

The drive controller 220B determines whether the moving speed of the position of an input operation is greater than or equal to a predetermined threshold speed, to determine whether the positional data is moving. The drive controller 220B calculates the moving speed of the position of the input operation, based on the rate of change in time of positional data input from the driver IC 151.

While the user is moving a fingertip along the surface of the top panel 120, the drive controller 220B vibrates the top panel 120 in order to change the dynamic frictional force acting on the fingertip. Since the dynamic frictional force is generated while the fingertip is being moved, the drive controller 220B vibrates the vibration element 140 when the moving speed becomes greater than or equal to the predetermined threshold speed.

Therefore, the amplitude value represented by the amplitude data output from the drive controller 220B is zero when the moving speed is less than the predetermined threshold speed; or if the moving speed becomes greater than or equal to the predetermined threshold speed, the amplitude value is set to a value obtained by multiplying the brightness of a pixel corresponding to coordinates of the input operation in the processed image by a predetermined coefficient.

Types of input operations include flicking, swiping, dragging, and tapping. Flicking is an operation to move a fingertip by a comparatively short distance along the surface of the top panel 120 as if to bounce the fingertip on the surface. Swiping is an operation to move a fingertip by a comparatively long distance along the surface of the top panel 120 as if to sweep the surface by the fingertip. Dragging is an operation to drag a GUI button or the like. Tapping is an operation to tap the surface of the top panel 120.

In the first embodiment, one of the objects is to reproduce a tactile sensation that would be sensed when touching the surface of an object, the epidermis of a living thing, or the like, when touching such an object imaged as a photograph, a picture, or the like displayed on the display panel 160. Therefore, among the input operations listed above, swiping on the surface of the top panel 120 may be considered as the input operation that is mainly applied in the embodiment.

The communication processor 230 executes processing necessary for the electronic device 100 to perform communication compliant with 3G (Generation), 4G (Generation), LTE (Long Term Evolution), WiFi, or the like.

The memory 250 stores data in which data representing types of applications, data representing areas of GUI operation parts and the like on which an input operation is performed, and data representing vibration patterns, are associated with each other. The memory 250 also stores brightness data. The brightness data will be described later using FIG. 9.

The memory 250 also stores data and programs necessary for the application processor 220 to execute applications, and data and programs necessary for the communication processor 230 to execute communication-processing.

The sinusoidal wave generator 310 generates a sinusoidal wave necessary to generate a drive signal for vibrating the top panel 120 at the natural frequency. For example, in the case of vibrating the top panel 120 at the natural frequency f of 33.5 kHz, the frequency of the sinusoidal wave is set to 33.5 kHz. The sinusoidal wave generator 310 inputs the sinusoidal wave signal in the ultrasonic range into the amplitude modulator 320.

Note that although a form of using the sinusoidal wave generator 310 will be described here, instead of the sinusoidal wave generator 310, a clock generator to generate a clock may be used here. For example, the slew rate of a clock generated by the clock generator may be set small to make the waveform of rising and falling edges of the clock less sharp. A clock having the slew rate set to a small value in this way may be used instead of a sinusoidal wave generated by the sinusoidal wave generator 310. In other words, instead of a sinusoidal wave, a waveform signal whose amplitude changes periodically may be used.

The amplitude modulator 320 modulates the amplitude of a sinusoidal wave signal input from the sinusoidal wave generator 310 by using amplitude data input from the drive controller 220B, to generate a drive signal. The amplitude modulator 320 modulates only the amplitude of the sinusoidal wave signal in the ultrasonic range input from the sinusoidal wave generator 310, without modulating the frequency and the phase, to generate the drive signal.

Therefore, the drive signal output by the amplitude modulator 320 is a sinusoidal wave signal in the ultrasonic range, in which only the amplitude of the sinusoidal wave signal in the ultrasonic range input from the sinusoidal wave generator 310 is modulated. Note that in the case of the amplitude data being zero, the amplitude of the drive signal becomes zero. This is equivalent to not outputting a drive signal from the amplitude modulator 320.

Next, by using FIG. 9, brightness data stored in the memory 250 will be described.

FIG. 9 is a diagram illustrating brightness data stored in the memory 250.

As illustrated in FIG. 9, a brightness data item is associated with a processed image ID representing the ID (Identifier) of a processed image and a speed data item, to be stored in the memory 250.

The processed image ID represents the identifier of a processed image, and is assigned to each processed image. The speed data item represents a moving speed of the position of an input operation assigned to a processed image. For example, when tracing the surface of an object with a fingertip, the tactile sensation varies depending on the speed. In order to provide a tactile sensation that varies depending on the moving speed of the position of an input operation, the electronic device 100 assigns multiple speed data items to a single processed image, and gives brightness data items that are different depending on the speed data items.

For example, a processed image having the processed image ID of Image 001 has six speed data items V1, V2, V3, V4, V5, and V6 assigned, and the six speed data items V1, V2, V3, V4, V5, and V6 are associated with brightness data items BR11(X, Y), BR12(X, Y), BR13(X, Y), BR14(X, Y), BR15(X, Y), and BR16(X, Y), respectively.

The brightness data item BR11(X, Y) is data representing a brightness value of a pixel at coordinates (X, Y) in the processed image, and brightness values of all the pixels included in the processed image are represented as such data items. This is the same for the brightness data items BR12 (X, Y), BR13(X, Y), BR14(X, Y), BR15(X, Y), and BR16 (X, Y). Values of the brightness included in the brightness data items BR11(X, Y), BR12(X, Y), BR13(X, Y), BR14(X, Y), BR15(X, Y), and BR16(X, Y) are different from each other for a pixel at the same coordinates.

Next, by using FIG. 10, a process executed by the drive controller 220B of the electronic device 100 in the first embodiment will be described.

Figure 10:
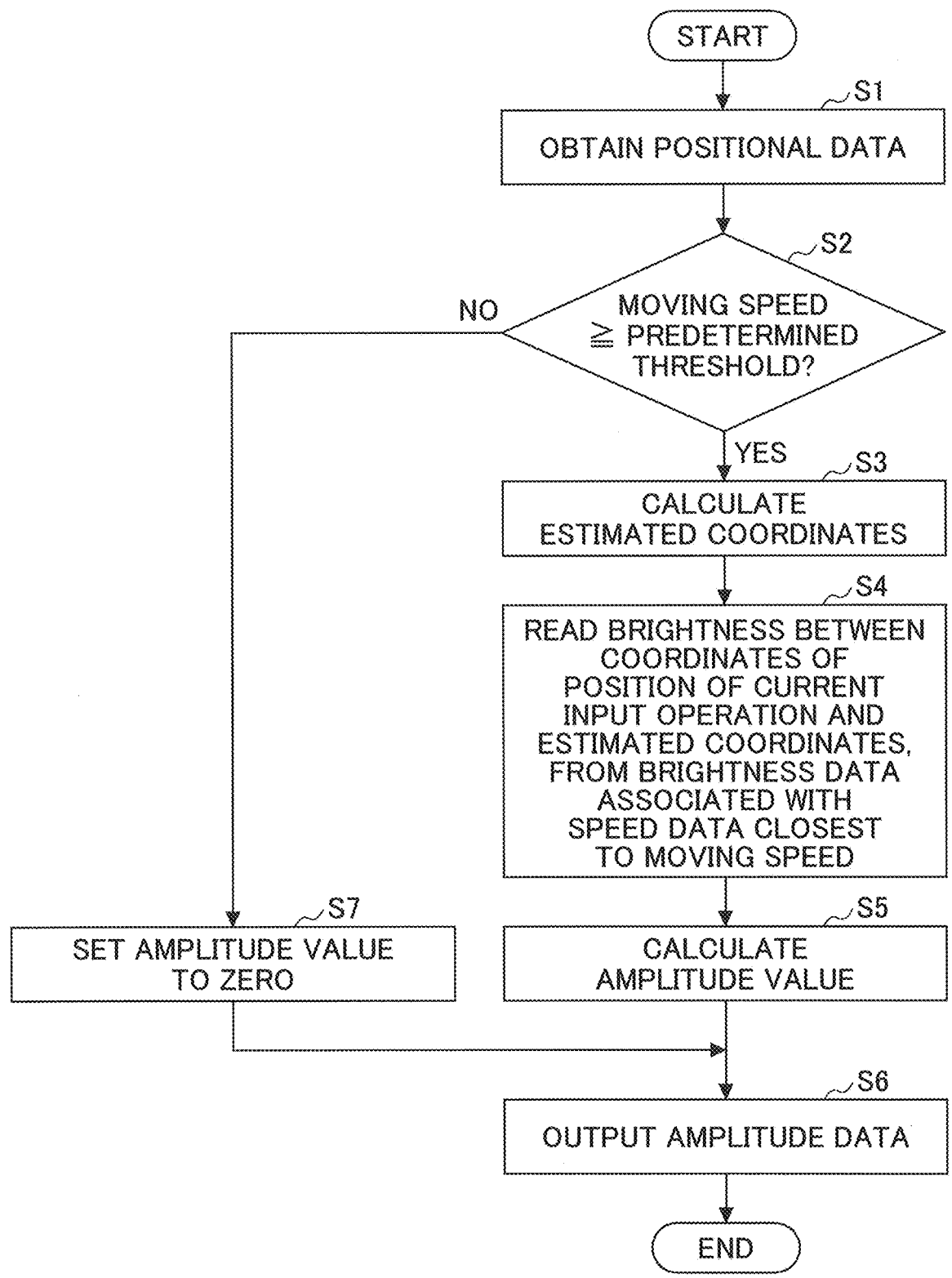
FIG. 10 is a flowchart illustrating a process executed by a drive controller of an electronic device in the first embodiment.

FIG. 10 is a flowchart illustrating a process executed by the drive controller 220B of the electronic device 100 in the first embodiment. Here, a case will be described as an example in which the processed image ID of a processed image obtained from an original image selected by the user is Image001 (see FIG. 9).

The OS (Operating System) of the electronic device 100 executes control for driving the electronic device 100 for each predetermined control cycle. Therefore, the drive controller 220B repeatedly executes a flow illustrated in FIG. 10 for each predetermined control cycle.

The drive controller 220B starts processing when the power source of the electronic device 100 is turned on.

The drive controller 220B obtains current positional data (Step S1). The current positional data represents the position of an input operation currently performed on the top panel 120.

The drive controller 220B determines whether the moving speed is greater than or equal to the predetermined threshold speed (Step S2). The moving speed may be calculated by vector operations. The threshold speed may be set, for example, as a minimum speed of the moving speed of a fingertip when an input operation is performed by swiping while moving the fingertip. Such a minimum speed may be set based on an experimental result, or may be set depending on the resolution or the like of the touch panel 150.

If having determined at Step S2 that the moving speed is greater than or equal to the predetermined threshold speed, the drive controller 220B calculates estimated coordinates after a time $\Delta t$ will have passed, based on the coordinates represented by the current positional data and the moving speed (Step S3). Here, $\Delta t$ is the control cycle of the drive controller 220B. In other words, the drive controller 220B calculates coordinates of the input operation that is estimated to be detected in the following control cycle.

The drive controller 220B reads brightness values of pixels between the coordinates of the position of the current input operation and the estimated coordinates, from the brightness data associated with the speed data closest to the moving speed (Step S4).

At Step S4, the drive controller 220B selects a brightness data item that is associated with a speed data item closest to the moving speed obtained at Step S2. Here, suppose that, for example, the brightness data item BR11(X, Y) is selected. The drive controller 220B reads all brightness values of pixels located between the coordinates of the position of the current input operation and the estimated coordinates from the brightness data item BR11(X, Y).

The drive controller 220B multiplies the brightness values read at Step S4 by a predetermined coefficient, to obtain amplitude values (Step S5). Executing Step S5 enables to obtain the amplitude values corresponding to all the pixels located between the coordinates of the position of the current input operation and the estimated coordinates.

The drive controller 220B outputs the amplitude data representing the amplitude values calculated at Step S5 (Step S6). This causes the amplitude modulator 320 to modulate the amplitude of a sinusoidal wave output from the sinusoidal wave generator 310, to generate a drive signal that drives the vibration element 140.

On the other hand, if having determined at Step S2 that the moving speed is not greater than or equal to the predetermined threshold speed (NO at Step S2), the drive controller 220B sets the amplitude value to zero (step S7).

Consequently, the drive controller 220B outputs amplitude data having the amplitude value set to zero, which causes the amplitude modulator 320 to generate a drive signal in which the amplitude of a sinusoidal wave output from the sinusoidal wave generator 310 is modulated to zero. Therefore, in this case, the vibration element 140 is not driven.

Figure 11B:
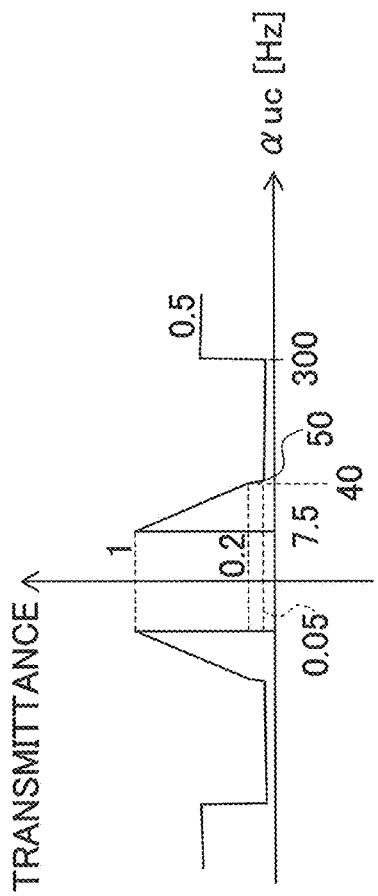
FIGS. 11A-11B are diagrams illustrating a transmission characteristic of a filter.
Figure 11A:
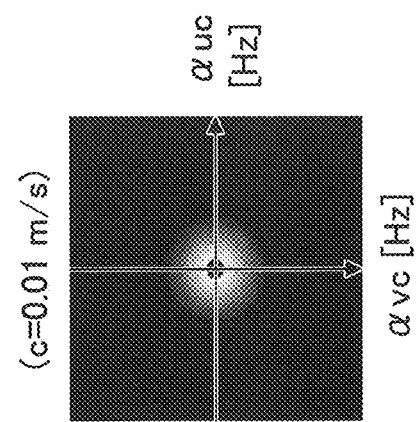

FIGS. 11A-11B and FIGS. 12A-12C are diagrams illustrating transmission characteristics of filters. Here, the u-axis and the v-axis are two axes of a uv coordinate system obtained after an original image has been converted into a monochrome image, and then, has a Fourier transform applied. Here, α represents the number of pixels per unit length in the original image, and the unit is pixel/m. Also, c represents the moving speed of an input operation. The moving speed c is a moving speed set in a filter when generating the filter. The electronic device 100 uses multiple filters generated based on mutually different multiple moving speeds c. FIGS. 11A-11B illustrate the transmission characteristic of a filter in which the moving speed c is set to 0.01 m/s.

FIG. 11A illustrates the transmission characteristic of the filter on a plane specified with the αuc-axis and the αvc-axis. The shade represents the transmittance; a lighter (whiter) spot indicates a higher transmittance, whereas a darker (blacker) spot indicates a lower transmittance.

FIG. 11B illustrates the transmission characteristic in a cross section along the αuc-axis of the filter illustrated in FIG. 11A. The transmission characteristic in the cross section along the αuc-axis represents a transmission band of the filter illustrated in FIG. 7, with a horizontal axis extended into the negative region. However, in the transmission characteristic illustrated in FIG. 11B, the horizontal axis to represent the frequency is the αuc-axis. Also, although the transmission characteristic illustrated in FIG. 11B is a frequency characteristic along the αuc-axis, a transmission characteristic in a cross section along the αvc-axis is similar.

A central dark part in the filter illustrated in FIG. 11A corresponds to a part less than or equal to 7.5 Hz in the transmission characteristic illustrated in FIG. 11B. A part outside of the central dark part in the filter illustrated in FIG. 11A where whiter spots gradually turn into darker spots corresponds to a part greater than or equal to 7.5 Hz and less than or equal to 50 Hz in the transmission characteristic illustrated in FIG. 11B. The black (dark) part on the outer side of the filter illustrated in FIG. 11A corresponds to a part greater than or equal to 50 Hz and less than or equal to 300 Hz in the transmission characteristic illustrated in FIG. 11B.

Note that the filter illustrated in FIG. 11A is presented in a calculable range, and a region of 300 Hz or higher where the transmittance becomes 0.5 is not presented. The calculable range means a range in which u and v are ½ at the maximum.

Figure 12C:
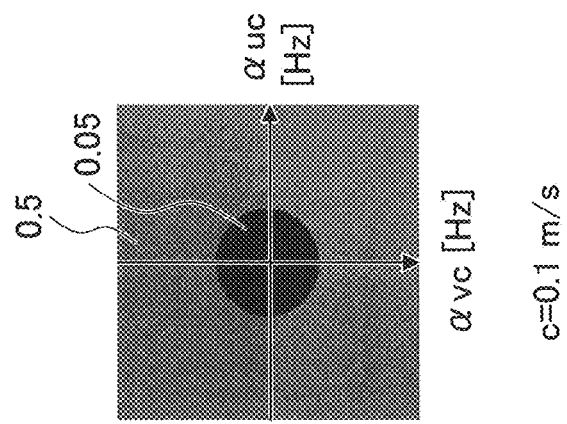
FIGS. 12A-12C are diagrams illustrating transmission characteristics of filters.
Figure 12B:
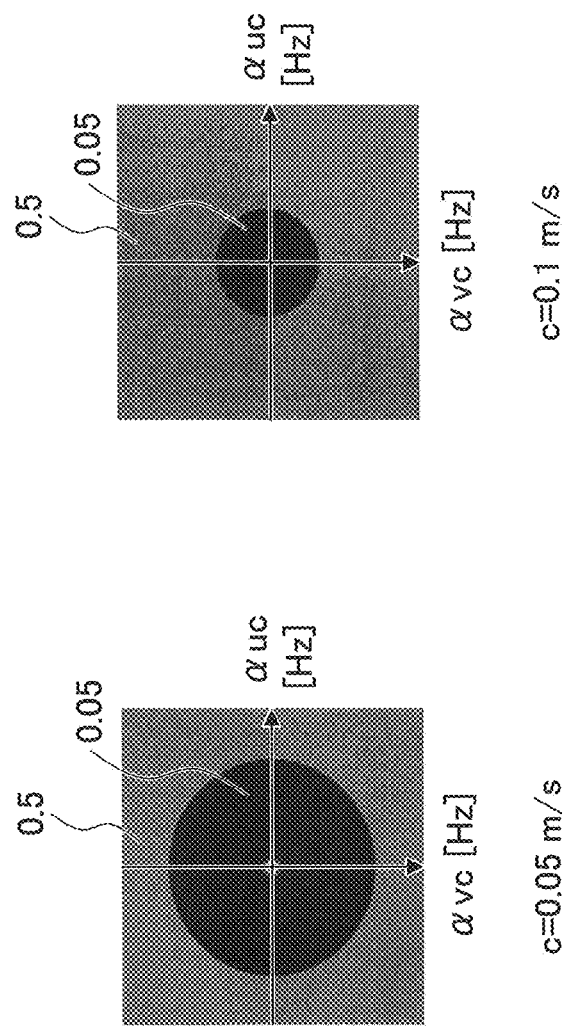
Figure 12A:
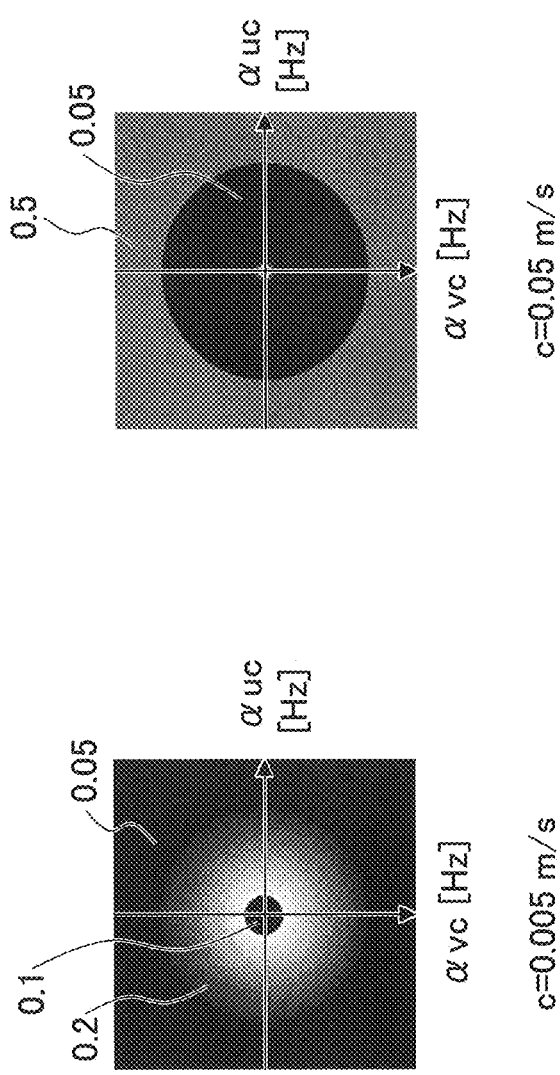

FIG. 12A, and 12B and 12C illustrate transmission characteristics of filters in which the moving speeds c are set to 0.005 m/s, 0.05 m/s, and 0.1 m/s, respectively.

Compared with the transmission characteristic of the filter in which the moving speed c is set to 0.01 m/s illustrated in FIG. 11A, the transmission characteristic of the filter in which the moving speed c is set to 0.005 m/s has the part for less than or equal to 50 Hz enlarged outward, and thus, has a smaller part of the transmittance of 0.05 over 50 Hz.

The transmission characteristic of the filter in which the moving speed c is set to 0.05 m/s has a reduced transmittance than the transmission characteristic of the filter in which the moving speed c is set to 0.01 m/s illustrated in FIG. 11A, and a boundary (300 Hz) appears between the regions of the transmittance being 0.05 and 0.5.

The transmission characteristic of the filter in which the moving speed c is set to 0.1 m/s has a further reduced transmittance than the transmission characteristic of the filter in which the moving speed c is set to 0.05 m/s, and has a greater region of the transmittance of 0.5.

As such, the transmission characteristic of a filter varies depending on the moving speed c. Here, although the transmission characteristics of the four filters set with the moving speeds c of 0.005 m/s, 0.01 m/s, 0.05 m/s, and 0.1 m/s, respectively, are taken as examples, the number of filters is not limited to four. There may be a greater number of filters. Also, the number of filters is at least two. The values of the moving speeds c may be set to proper values depending on the content of an image or a type of an image.

Next, by using FIG. 13 to FIG. 18, image processing executed by the image processor 220A will be described.

Figure 13:
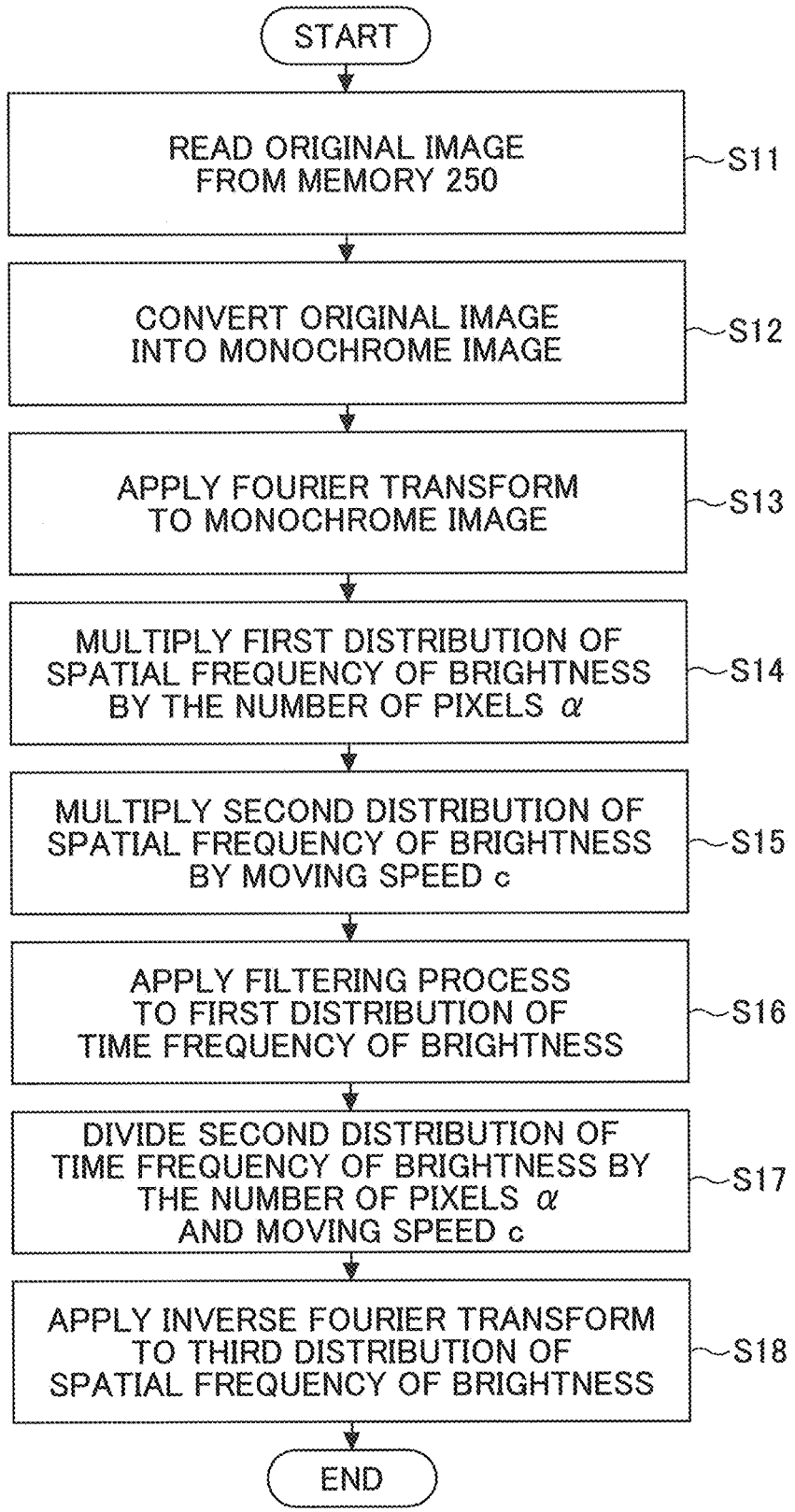
FIG. 13 is a flowchart illustrating image processing executed by an image processor.

FIG. 13 is a flowchart illustrating an image processing executed by the image processor 220A. FIGS. 14A to FIG. 18 are diagrams illustrating stages of image processing executed by the image processor 220A to obtain a processed image from an original image. Here, a form of obtaining a processed image with six types of the moving speeds c will be described. Therefore, six filters are used corresponding to the six types of the moving speeds c.

Figure 14A:
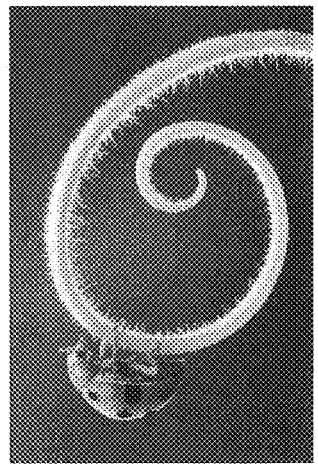
FIGS. 14A-14C are diagrams illustrating stages of image processing executed by an image processor to obtain a processed image from an original image.

First, the main controller 221A reads an original image as illustrated in FIG. 14A from the memory 250 (Step S11). Thus, the original image is prepared. Although the original image may be a color image or may be a monochrome image, a case of a color image will be described here. Data representing the original image is a photograph or a picture selected by the user, and taken here as an example is a photograph that captures a ladybug and a plant.

Figure 14B:
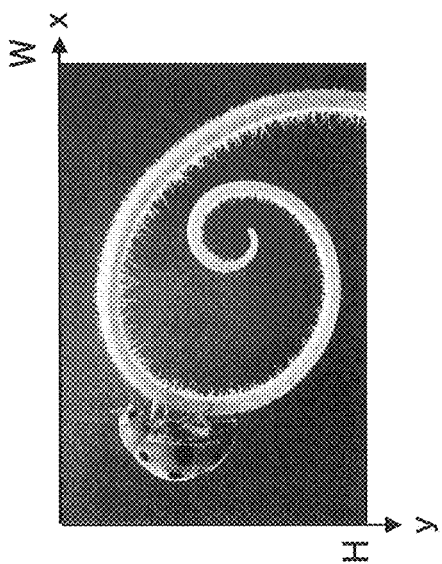

Next, the main controller 221A converts the original image into a monochrome image as illustrated in FIG. 14B (Step S12). Here, xy coordinates are assigned to the monochrome image for the sake of description. The xy coordinate system has the origin at the upper left corner of the monochrome image, the x-axis extending rightward, and the y-axis extending downward. Note that the xy coordinates represented in small letters are different from XY coordinates in the XYZ coordinate system illustrated in FIG. 2 and FIG. 3. The number of pixels of the monochrome image is W×H, for example, W=1024 pixels times H=684 pixels.

In order to convert a color image into a monochrome image, the following Expression (3) may be used.

$$I(x,y)=(0.299*R+0.587*G+0.114*B) \qquad (3)$$

In Expression (3), R, G, and B represent the brightness of light with respect to the three primary colors (red, green, and blue) included in a color image. In Expression (3), coefficients (0.299, 0.587, 0.114) by which R, G, and B are multiplied, respectively, are numerical values given by empirical rules based on the vision of a human being. Note that these values of the coefficients are merely examples.

Figure 14C:
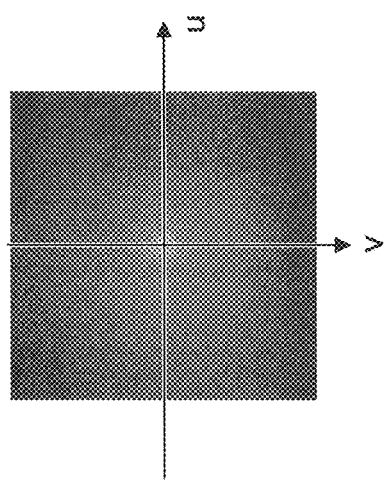

Next, the Fourier transformer 222A applies a Fourier transform to the monochrome image, to obtain a first distribution of spatial frequencies of the brightness of the monochrome image illustrated in FIG. 14C (Step S13). The Fourier transform may be performed by using the following Expression (4) where u and v are values on the u-axis and the v-axis in the uv coordinate system, respectively, obtained after the Fourier transform; and W and H represent the numbers of pixels in the x-axis direction and the y-axis direction of the monochrome image, respectively.

$$F(u, v) = \sum_{x=0}^{W-1}\sum_{y=0}^{H-1} I(x, y)e^{-j\{2\pi(\frac{ux}{W}+\frac{vy}{H})\}} \qquad (4)$$

Since the brightness included in the monochrome image is assigned to each pixel, the brightness is represented by a discrete value. Therefore, Expression (4) is an expression of a Fourier transform applicable to discrete values.

Figure 15A:
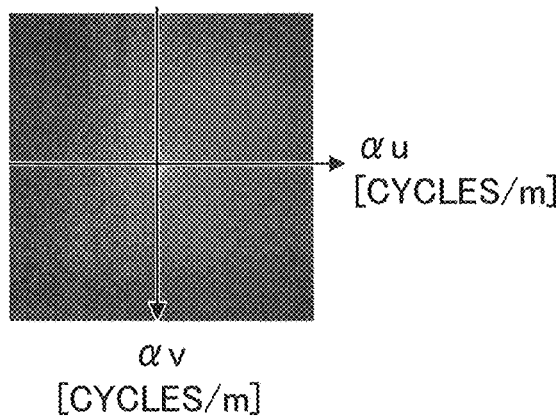
FIGS. 15A-15B are diagrams illustrating stages of image processing executed by an image processor to obtain a processed image from an original image.
Figure 15B:
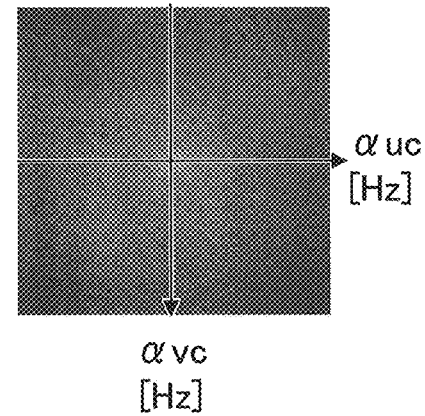

Next, the data processor 223A multiplies the first distribution of spatial frequencies of the brightness of the monochrome image by α representing the number of pixels per unit length of the original image (the number of pixels (pixel/m)), to obtain a second distribution of spatial frequencies of the brightness of the monochrome image illustrated in FIG. 15A (Step S14). The second distribution of spatial frequencies of the brightness is obtained by converting the first distribution of spatial frequencies of the brightness into the spatial frequency in display of the original image.

In the second distribution of spatial frequencies of the brightness, the u-axis and the v-axis of the first distribution of spatial frequencies of the brightness are multiplied by a to turn into the αu-axis and the αv-axis.

Next, the data processor 224A multiplies the second distribution of spatial frequencies of the brightness of the monochrome image by the moving speed c of the input operation (m/s), to obtain the first distribution of time frequencies of the brightness of the monochrome image illustrated in FIG. 15A (Step SC). The moving speed c is set with each of V1, V2, V3, V4, V5, and V6 illustrated in FIG. 9.

The data processor 224A obtains six first distributions of time frequencies of the brightness of the monochrome image, with setting the moving speed c to V1, V2, V3, V4, V5, and V6, respectively.

In the first distribution of time frequencies of brightness, the αu-axis and the αv-axis of the second distribution of spatial frequencies of the brightness are multiplied by c to turn into the αuc-axis and the αvc-axis. The unit of values in the αuc-axis and the αvc-axis is Hz.

Figure 16:
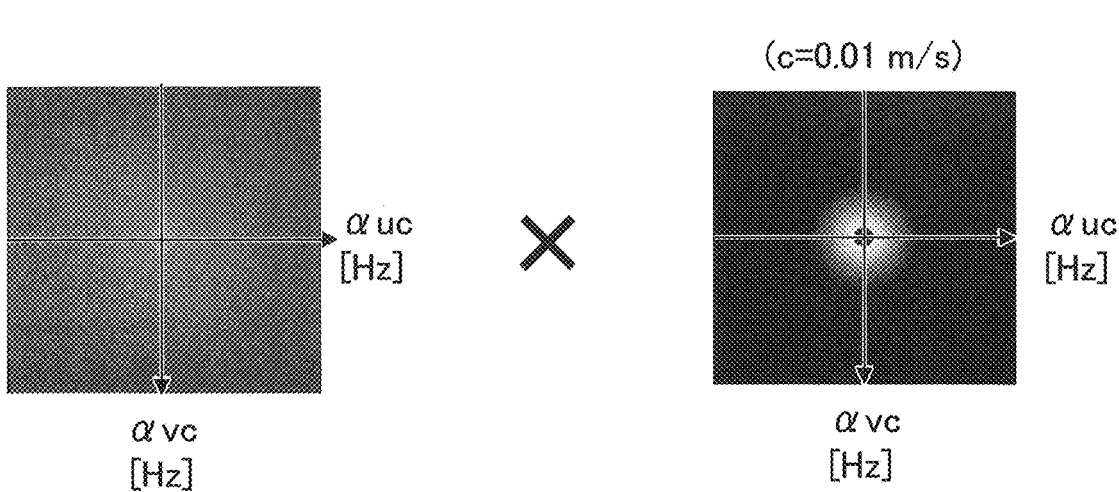
FIG. 16 is a diagram illustrating a stage of image processing executed by an image processor to obtain a processed image from an original image.

Next, as illustrated in FIG. 16, the filtering processor 225A applies a filtering process to the first distribution of time frequencies of the brightness of the monochrome image (Step SC). Here, the first distribution of time frequencies of the brightness of the monochrome image is multiplied by the transmittance of the filter.

Figure 17A:
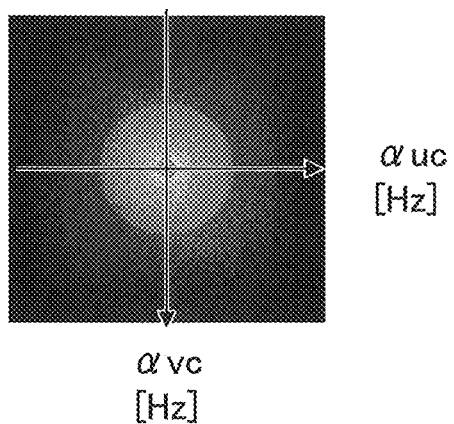
FIGS. 17A-17B are diagrams illustrating stages of image processing executed by an image processor to obtain a processed image from an original image.

As a result of the filtering process, as illustrated in FIG. 17A, the second distribution of time frequencies of the brightness of the monochrome image is obtained.

The filtering processor 225A uses six filters in which the moving speeds c are set to V1, V2, V3, V4, V5, and V6, respectively, to obtain six second distributions of time frequencies of the brightness of the monochrome image from the six first distributions of time frequencies of the brightness of the monochrome image in which the moving speeds c are set to V1, V2, V3, V4, V5, and V6, respectively.

Figure 17B:
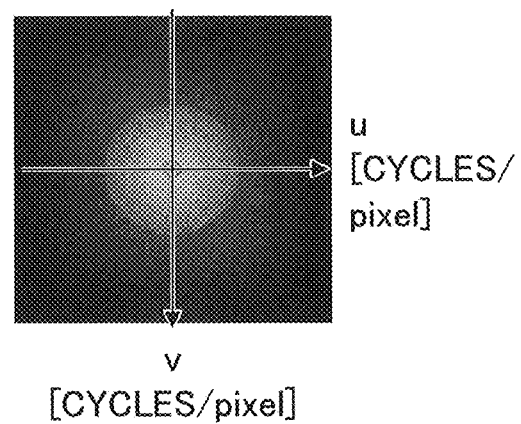

Next, the data processor 226A divides the second distribution of time frequencies of the brightness of the monochrome image by α representing the number of pixels per unit length of the original image, and the moving speed c of the input operation (Step S17). By dividing the second distribution of time frequencies of the brightness of the monochrome image by α representing the number of pixels per unit length of the original image, and the moving speed c of the input operation, a third distribution of spatial frequencies of the brightness of the monochrome image is obtained as illustrated in FIG. 17B.

The process of Step S17 is performed for each of the six second distributions of time frequencies of the brightness of the monochrome image, to obtain six third distributions of spatial frequencies of the brightness of the monochrome image.

Figure 18:
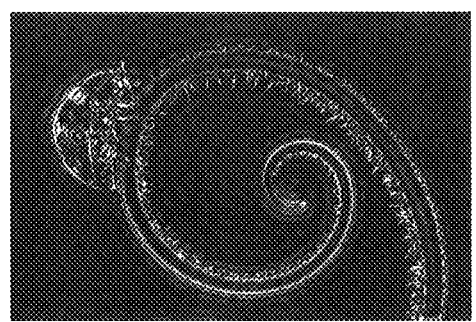
FIG. 18 is a diagram illustrating a stage of image processing executed by an image processor to obtain a processed image from an original image.
Figure 19C:
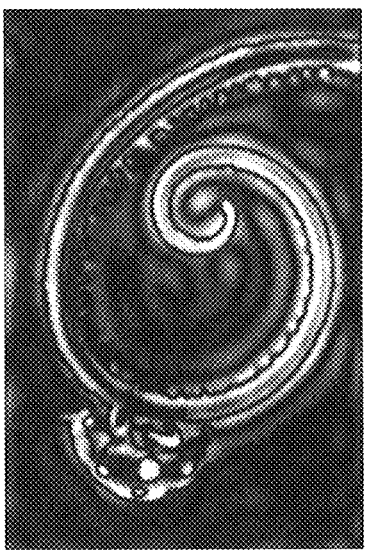
FIGS. 19A-19F are diagrams illustrating processed images.
Figure 19B:
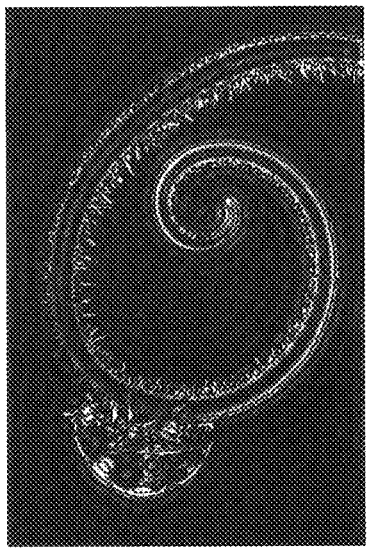
Figure 19A:
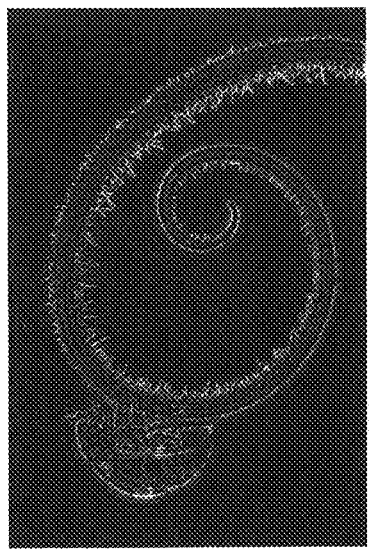
Figure 19F:
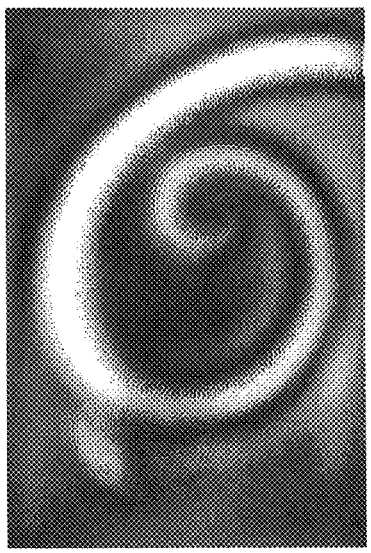
Figure 19E:
Figure 19D:
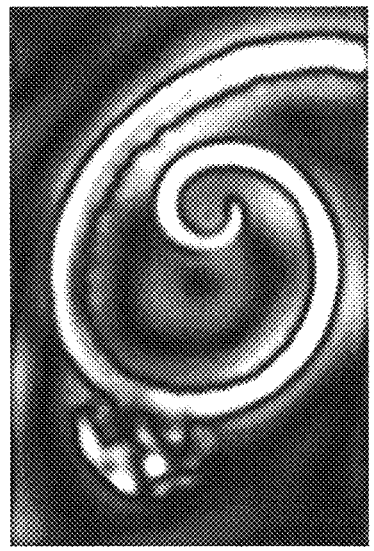

Next, the inverse Fourier transformer 227A applies an inverse Fourier transform to the third distribution of spatial frequencies of the brightness of the monochrome image (Step S18). By Step S18, a processed image illustrated in FIG. 18 is obtained.

The inverse Fourier transform may be performed by using the following Expression (5) where x and y are coordinate values in the xy coordinate system of the monochrome image; u and v are coordinate values on the u-axis and the v-axis of the uv coordinate system obtained after the Fourier transform; and W and H are the numbers of pixels in the x-axis direction and in the y-axis direction of the monochrome image.

$$I(x, y) = \frac{1}{WH}\sum_{x=0}^{W-1}\sum_{y=0}^{H-1} F(u, v)e^{j\{2\pi(\frac{ux}{W}+\frac{vy}{H})\}} \qquad (5)$$

Since the third distribution of spatial frequencies of the brightness of the monochrome image is constituted with discrete values, Expression (5) is an expression to perform inverse an Fourier transform applicable to discrete values.

By executing the above process for the six moving speeds c, six processed images are obtained. Data of the processed image is saved in the memory 250.

FIGS. 19A-19F are diagrams illustrating processed images. Six processed images illustrated in FIGS. 19A, 19B, 19C, 19D, 19E and 19F are obtained from the original image illustrated in FIG. 14A, with setting of the moving speed c of the input operation to 0.005 m/s, 0.01 m/s, 0.03 m/s, 0.06 m/s, 0.1 m/s, and 0.17 m/s, respectively.

As illustrated in FIGS. 19A-19F, in a processed image obtained with a lower moving speed, the image of a ladybug and a plant is presented more minutely. As the moving speed becomes higher, the image of a ladybug and a plant blurs gradually.

Such multiple processed images are stored in the memory 250, and when the user moves a fingertip touching the top panel 120, the drive controller 220B reads data of a processed image obtained with a moving speed c closest to the moving speed of the fingertip from the memory 250, to generate a drive signal.

Next, a drive control process executed by the drive controller 220B will be described.

FIG. 20 is a diagram illustrating the process of the drive controller 220B. FIGS. 21A-21B are diagrams illustrating a process of extracting brightness from a processed image.

FIG. 20 illustrates positions P1, P2, P3, and P4 detected by the touch panel 150 in a state where the original image is displayed on the display panel 160, and an input operation is performed on the top panel 120. In the case of performing the input operation on the top panel 120, although positions of the input operation are detected by the touch panel 150 at finer intervals than the positions P1 to P4 in practice, here, the positions P1, P2, P3, and P4 are assumed to be the positions detected by the touch panel 150 at consecutive control cycles for the sake of description.

In the state where the original image is displayed on the display panel 160, and the input operation is performed on the top panel 120, the drive controller 220B obtains the amplitude of the drive signal based on the brightness of a pixel corresponding to the coordinates of the input operation in the processed image, and drives the vibration element 140.

The drive controller 220B also calculates estimated coordinates after a time $\Delta t_p$ time will have passed, based on the coordinates representing the current positional data and the moving speed. Here, $\Delta t_p$ is a time longer than the control cycle $\Delta t$ of the drive controller 220B. For example, $\Delta t_p$ is set to 0.13 s and the control cycle $\Delta t$ is set to 0.1 s.

As designated with a solid-line arrow A1, when the position of the input operation moves from the position P1 to the position P2, as designated with a dashed-line arrow B2, the drive controller 220B obtains a vector of a predicted trajectory of the position of the input operation on the extended line of the arrow A1. The vector of the predicted trajectory designated with the arrow B2 has the starting point at the position P2 and the ending point at a position P21.

Here, the speed vector c2 of the moving speed of the input operation at the position P2 is represented by the following Expression (6). Note that t1 is a time when the input operation is detected at the position P1, and t2 is a time when the input operation is detected at the position P2. Also, the vectors P1 and P2 are vectors that have the common starting point at the origin (not illustrated) and the respective end points at the positions P1 and P2. Since the positions of the vectors P1 and P2 are represented in the units of pixels, these are divided by α representing the number of pixels per unit length of the original image, to be represented in the unit of m/s.

$$\vec{c}2 = \frac{\vec{p}2 - \vec{p}1}{t2 - t1} \cdot \frac{1}{\alpha} \qquad (6)$$

A vector T2 of the predicted trajectory designated with the arrow B2 is given by the following Expression (7). Since the position represented by the vector T2 is represented in the units of pixels as with the vectors P1 and P2, the speed vector c2 is multiplied by $\Delta t_p$ and α representing the number of pixels per unit length of the original image.

$$\vec{T}2 = \vec{p}2 + \vec{c}2 \Delta t_p \alpha \qquad (7)$$

At this time, the drive controller 220B selects one of the six processed images illustrated in FIG. 21A that is closest to the speed represented by the speed vector obtained by Expression (6). Here, assume that the moving speed c of 0.06 m/s illustrated in FIG. 21B is obtained, which corresponds to the lower left image in FIG. 21A.

FIG. 21B illustrates the positions P1 and P2 at the same position as the positions P1 and P2 in the original image illustrated in FIG. 20. FIG. 21B also illustrates the arrow A1, the arrow B2, and the ending point P21 as illustrated in FIG. 20.

Also, the drive controller 220B reads the brightness of pixels from the starting point (at the position P2) to the ending point P21 of the vector T2 of the predicted trajectory.

Figure 22:
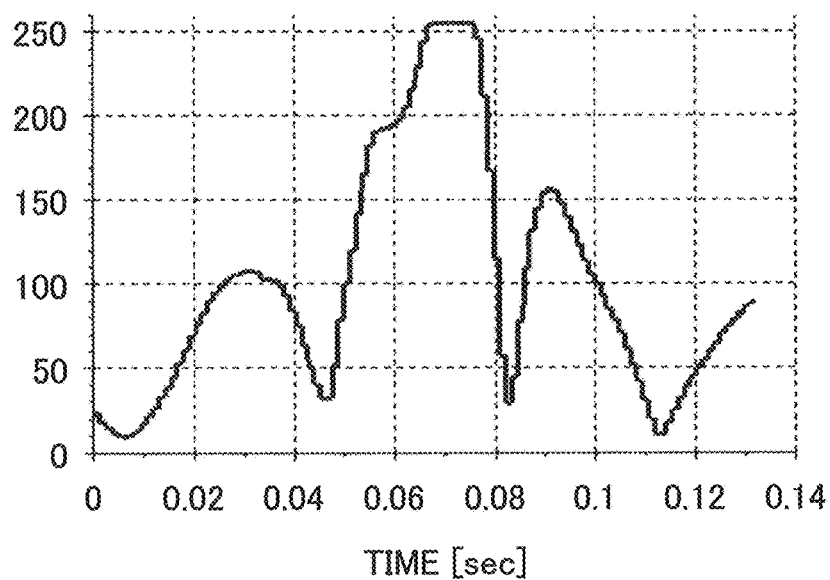
FIG. 22 is a diagram illustrating a time distribution of the brightness of pixels of a vector of a predicted trajectory.
Figure 23:
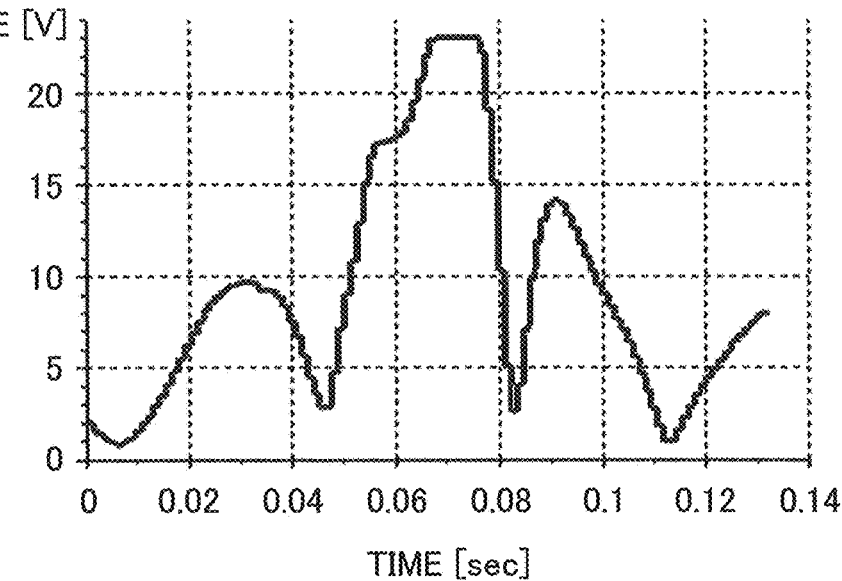
FIG. 23 is a diagram illustrating amplitude of a drive signal obtained from the time distribution of the brightness illustrated in FIG. 22.

FIG. 22 is a diagram illustrating a time distribution of the brightness of pixels of the vector T2 of the predicted trajectory. FIG. 23 is a diagram illustrating the amplitude of a drive signal obtained from the time distribution of the brightness illustrated in FIG. 22.

Suppose that the brightness of pixels of the vector T2 of the predicted trajectory has been obtained as illustrated in FIG. 22. The pixels illustrated in FIG. 22 are obtained for 0.13 s ($\Delta t_p$) where the position at 0 s corresponds to the starting point (at the position P2) of the vector T2 of the predicted trajectory, and the position at 0.13 s corresponds to the ending point P21.

The time distribution of the brightness illustrated in FIG. 22 represents a time distribution of the brightness obtained for the pixels at the positions of the fingertip in the case where the moving speed of the position of the input operation is 0.06 m/s, and the position of the input operation moves from the position P2 to the ending point P21 during the time period of 0.13 s.

The drive controller 220B obtains a time distribution of the amplitude value as illustrated in FIG. 23, by multiplying the brightness obtained as above by a predetermined coefficient. The predetermined coefficient is a voltage value, which may be determined in advance. Also, the predetermined coefficient may be associated with the brightness data illustrated in FIG. 9, to be set depending on the type or the like of an image.

When the position of the input operation is located at the position P2 and is moving, the drive controller 220B drives the vibration element 140 by the drive signal of the amplitude illustrated in FIG. 23. Since data of the amplitude illustrated in FIG. 23 covers the period of 0.13 s, which is longer than the control cycle $\Delta t$ (0.1 s), in practice, after having driven the vibration element 140 for 0.1 s, at the next position P3, based on a vector of a predicted trajectory designated with a dashed-line arrow B3, a time distribution of the brightness is obtained in the same way as in the case of FIG. 22, and the drive controller 220B drives the vibration element 140 with the amplitude based on the newly obtained time distribution of the brightness.

Note that a filtering process may be applied to the data of the amplitude illustrated in FIG. 23 with an LPF (Low Pass Filter) to make the waveform smoother.

Figure 24A:
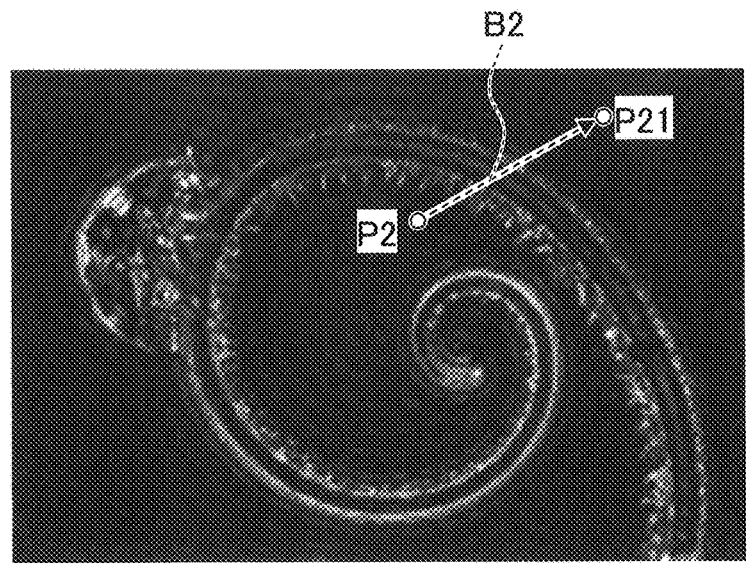
FIGS. 24A-24B are diagrams illustrating a processed image and a time distribution of extracted brightness.
Figure 24B:
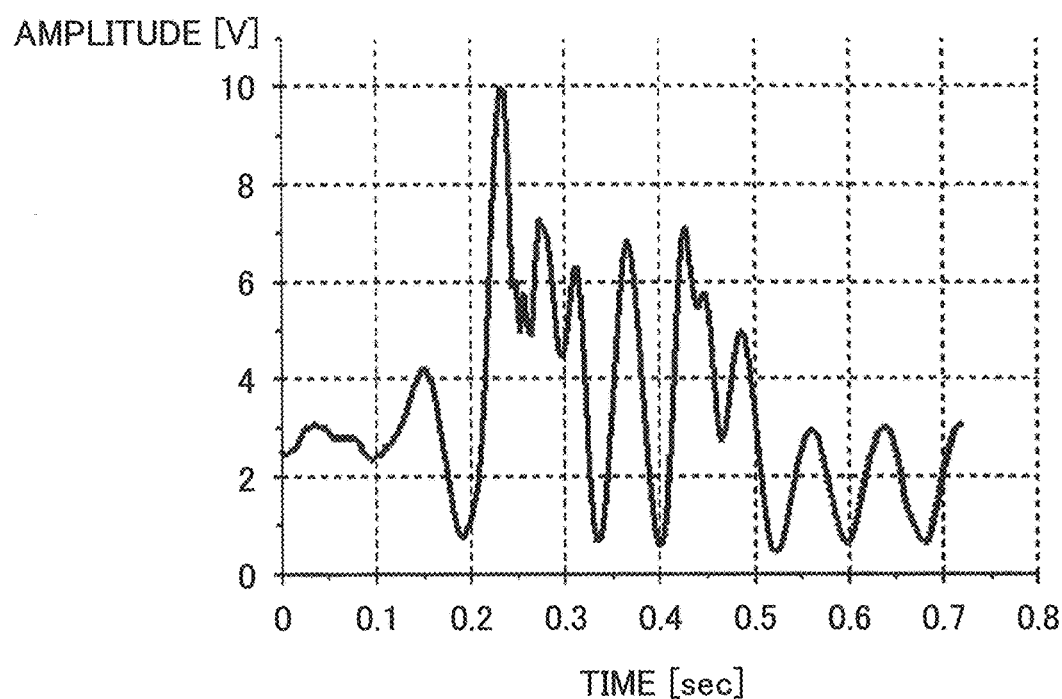

FIGS. 24A-24B are diagrams illustrating a processed image set with the moving speed c of 0.01 m/s and a time distribution of extracted brightness. FIG. 24A illustrates a processed image with the position P2, the ending point P21, and the arrow B2 as in the case of the processed image illustrated in FIG. 21B.

As illustrated in FIG. 24B, a time distribution of the brightness extracted from the processed image of the moving speed c of 0.01 m/s has shorter time cycles of amplitude fluctuation, and the number of ups and downs of the amplitude increases, compared with the time distribution of the brightness extracted from the processed image of the moving speed c of 0.06 m/s.

As such, since time distributions of the brightness extracted from processed images of different moving speeds c are different from each other, the amplitude of a drive signal to drive the vibration element 140 varies depending on the moving speed of the position of the input operation.

As described above, the electronic device 100 in the first embodiment uses a filter that reduces the amplitude in the frequency band detectable by Pacini's corpuscles to a certain extent when generating a drive signal to drive the vibration element 140 depending on an image being displayed on the display panel 160.

Driving the vibration element 140 by a drive signal whose amplitude is adjusted by using such a filter enables a human being to easily detect various frequencies or vibrations of amplitudes, and to improve tactile sensations.

Note that as above, what has been described is a form of driving the vibration element 140 by a drive signal in the ultrasonic range in order to generate a natural vibration in the ultrasonic range on the top panel 120. Therefore, the sinusoidal wave generator 310 that generates a sinusoidal wave in the ultrasonic range is used.

However, the sinusoidal wave generator 310 may generate a sinusoidal wave of a frequency in the audible range. In addition, it is possible to drive the vibration element 140 by a drive signal in the audible range, to generate a vibration at a frequency in the audible range on the top panel 120.

Second Embodiment

Figure 25:
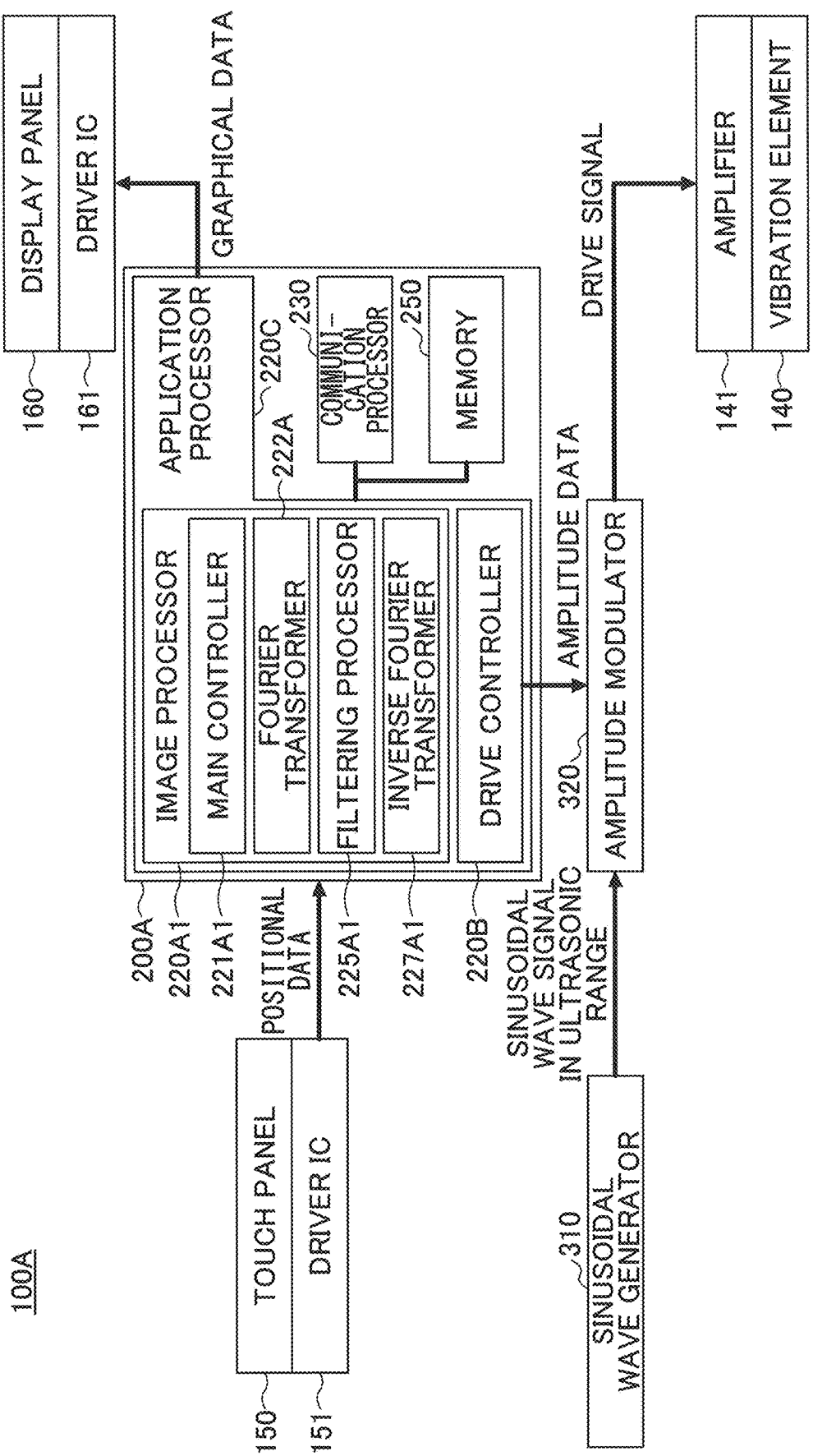
FIG. 25 is a diagram illustrating a configuration of an electronic device in a second embodiment.

FIG. 25 is a diagram illustrating a configuration of an electronic device 100A in a second embodiment.

The electronic device 100A includes a vibration element 140, an amplifier 141, a touch panel 150, a driver IC (Integrated Circuit) 151, a display panel 160, and a driver IC 161, a controller 200A, a sinusoidal wave generator 310, and an amplitude modulator 320.

The electronic device 100A in the second embodiment has a configuration in which the controller 200 of the electronic device 100 in the first embodiment is replaced with the controller 200A. Since the other elements are the same, the same reference codes are assigned to the same elements, and their description may be omitted. That is, in the following, different points will be described mainly.

The controller 200A includes an application processor 220C, a communication processor 230, and a memory 250. The controller 200A is implemented with, for example, an IC chip. The application processor 220C includes an image processor 220A1 and a drive controller 220B.

The controller 200A is provided instead of the controller 200 in the first embodiment. The controller 200A includes the application processor 220C, which is different from the controller 200 in the first embodiment.

The application processor 220C includes the image processor 220A1 instead of the image processor 220A in the first embodiment.

The image processor 220A1 includes a main controller 221A1, a Fourier transformer 222A, a filtering processor 225A1, and an inverse Fourier transformer 227A1. The Fourier transformer 222A is substantially the same as the Fourier transformer 222A of the image processor 220A in the first embodiment.

The main controller 221A1 is a processing unit to manage execution of the image processor 220A1, which executes, for example, reading an original image selected by the user from the memory 250, and storing the processed image in the memory 250.

The filtering processor 225A1 obtains a second distribution of spatial frequencies of the brightness of the original image that has transmitted through the filter among the first distribution of spatial frequencies of the brightness of the original image generated by the Fourier transformer 222A.

The filter of the filtering processor 225A1 in the second embodiment has a transmission band characteristic obtained by converting a transmission band characteristic in which a transmission degree of the brightness in a frequency band detectable by Pacini's corpuscles is reduced to a predetermined degree, into a transmission band characteristic in spatial frequencies based on $\alpha$ representing the number of pixels per unit length of the original image, and the moving speed c of the input operation.

The inverse Fourier transformer 227A1 applies an inverse Fourier transform to the second distribution of spatial frequencies of the brightness generated by the filtering processor 225A1, to obtain a processed image.

In other words, in the second embodiment, a filter is used in which the two axes (the $\alpha uc$-axis and the $\alpha vc$-axis) of the filter in the first embodiment are divided by $\alpha$ representing the number of pixels, and the moving speed c. Six filters according to the six moving speeds c may be used.

FIG. 26A-26D are diagrams illustrating stages of image processing executed by the image processor 220A1 to obtain a processed image from an original image.

First, the main controller 221A1 reads an original image from the memory 250. Thus, the original image is prepared. The original image is the same as that illustrated in FIG. 14A.

Figure 26C:
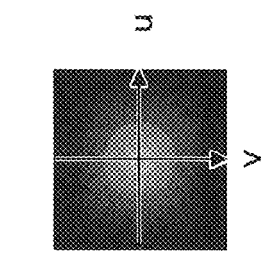
FIG. 26A-26D are diagrams illustrating stages of image processing executed by an image processor to obtain a processed image from an original image.
Figure 26B:
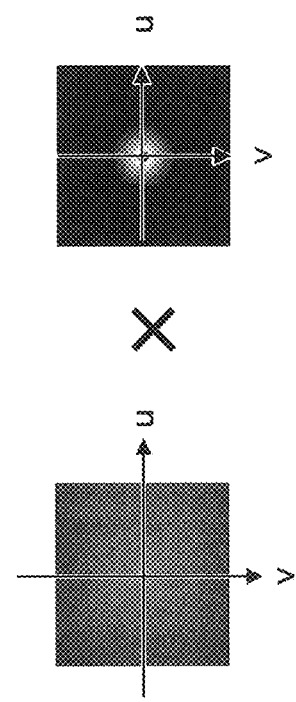
Figure 26D:
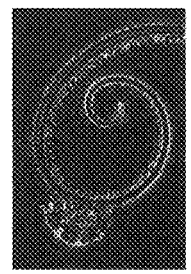
Figure 26A:
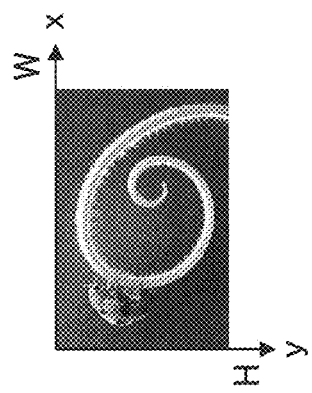

Next, the main controller 221A1 converts the original image into a monochrome image illustrated in FIG. 26A.

Next, the Fourier transformer 222A applies a Fourier transform to the monochrome image illustrated in FIG. 26A, to obtain a first distribution of spatial frequencies of the brightness of the monochrome image illustrated in FIG. 26B.

Up to here, the steps are substantially the same as Steps S11 to S13 in the first embodiment.

Next, the filtering processor 225A1 applies a filtering process to the first distribution of spatial frequencies of the brightness of the monochrome image. Here, the first distribution of spatial frequencies of the brightness of the monochrome image is multiplied by the transmittance of the filter. The filter is a filter of spatial frequencies specified with the u-axis and the v-axis as illustrated in FIG. 26B.

Such a filter is obtained by dividing the filter of time frequencies specified with the $\alpha uc$-axis and the $\alpha vc$-axis in the first embodiment by a representing the number of pixels, and the moving speed c. In other words, the filter of the filtering processor 225A1 in the second embodiment is obtained by dividing the filter of the filtering processor 225A in the first embodiment by $\alpha$ representing the number of pixels, and the moving speed c, which is then converted into a filter of the spatial frequency. For example, by using six moving speeds c as in first embodiment, six types of filters can be generated.

As a result of the filtering process, the second distribution of spatial frequencies of the brightness of the monochrome image is obtained as illustrated in FIG. 26C.

By using six filters depending on the six moving speeds c, six second distributions of spatial frequencies of the brightness of the monochrome image depending on the six moving speeds c are obtained.

Next, the inverse Fourier transformer 227A1 applies an inverse Fourier transform to the second distribution of spatial frequencies of the brightness of the monochrome image, and hence, a processed image illustrated in FIG. 26D is obtained. Six processed images are obtained from the six second distributions of spatial frequencies of the brightness of the monochrome image depending on the six moving speeds c.

By executing the above process for multiple moving speeds c, multiple processed images are obtained and saved in the memory 250.

Then, by using the processed images, as in the first embodiment, in a state where the original image is displayed on the display panel 160, and the input operation is performed on the top panel 120, the drive controller 220B obtains the amplitude of the drive signal based on the brightness of a pixel corresponding to the coordinates of the input operation in the processed image, and drives the vibration element 140.

As described above, the electronic device 100A in the second embodiment uses a filter that reduces the amplitude in the frequency band detectable by Pacini's corpuscles to a certain extent when generating a drive signal to drive the vibration element 140 depending on an image being displayed on the display panel 160.

Driving the vibration element 140 by a drive signal whose amplitude is adjusted by using such a filter enables a human being to easily detect various frequencies or vibrations of amplitudes, and to improve tactile sensations.

As above, an electronic device and a drive control method of the electronic device have been described according to exemplary embodiments. Note that the present invention is not limited to the embodiments specifically disclosed as above, but various modifications and changes can be made without deviating from the subject matters described in the claims.

For example, the following method can be derived based on the embodiments without deviating from the subject matters described in the claims:

a drive control method of an electronic device that includes a display;

a top panel placed on a display surface of the display, and including an operation surface;

a vibration element configured to generate a vibration on the operation surface;

a position detector configured to detect a position of an input operation performed on the operation surface;

a memory; and a processor configured to execute applying a Fourier transform to a first image that includes brightness information, to obtain a first distribution of spatial frequencies of brightness of the first image, filtering the first distribution of the spatial frequencies of the brightness through a filter having a transmission band characteristic obtained by converting a transmission band characteristic in which a transmission degree of the brightness in a frequency band detectable by Pacini's corpuscles is reduced to a predetermined degree, into the transmission band characteristic in the spatial frequencies based on a coefficient depending on a display size of the first image and a predetermined speed of the input operation, to obtain a second distribution of the spatial frequencies of the brightness, applying an inverse Fourier transform to the second distribution of the spatial frequencies of the brightness, to obtain a second image, and the drive control method comprising:

driving the vibration element by a drive signal that has an amplitude according to brightness of the second image corresponding to a position of the input operation detected by the position detector.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device comprising:

a display;

a top panel placed on a display surface of the display, and including an operation surface;

a vibration element configured to generate a vibration on the operation surface;

a position detector configured to detect a position of an input operation performed on the operation surface;

a memory; and a processor configured to execute applying a Fourier transform to a first image that includes brightness information, to obtain a first distribution of spatial frequencies of brightness of the first image, obtaining a second distribution of the spatial frequencies of the brightness by multiplying the first distribution of the spatial frequencies of the brightness by a coefficient depending on a display size of the first image, obtaining a first distribution of time frequencies of the brightness based on the second distribution of the spatial frequencies of the brightness, and a predetermined speed of the input operation, filtering the first distribution of the time frequencies of the brightness through a filter having a transmission band characteristic in which a transmission degree of the brightness in a frequency band detectable by Pacini's corpuscles is reduced to a predetermined degree, to obtain a second distribution of the time frequencies of the brightness, converting the second distribution of the time frequencies of the brightness into a third distribution of the spatial frequencies of the brightness, based on the coefficient and the predetermined speed, applying an inverse Fourier transform to the third distribution of the spatial frequencies of the brightness, to obtain a second image, and driving the vibration element by a drive signal that has an amplitude according to brightness of the second image corresponding to a position of the input operation detected by the position detector.

2. The electronic device as claimed in claim 1, wherein the obtaining the first distribution obtains a plurality of first distributions of the time frequencies of the brightness, based on the second distribution of the spatial frequencies of the brightness, and a plurality of predetermined speeds of the input operation, wherein the filtering includes a plurality of filters depending on predetermined speeds of the input operation, to obtain a plurality of second distributions of the time frequencies of the brightness, wherein the converting converts the plurality of the second distributions of the time frequencies of the brightness into a plurality of third distributions of the spatial frequencies of the brightness, based on the coefficient and the plurality of the predetermined speeds of the input operation, wherein the applying the inverse Fourier transform applies the inverse Fourier transform to the plurality of the third distributions of the spatial frequencies of the brightness, to obtain a plurality of second images depending on the plurality of the predetermined speeds of the input operation, and wherein the driving drives the vibration element by the drive signal that has the amplitude according to the brightness of the second image corresponding to the position of the input operation detected by the position detector, by using the second image selected from among the plurality of the second images depending on the plurality of the predetermined speeds of the input operation that corresponds to the predetermined speed of the input operation closest to a moving speed of the input operation detected by the position detector.

3. An electronic device comprising:
a display;
a top panel placed on a display surface of the display, and including an operation surface;
a vibration element configured to generate a vibration on the operation surface;
a position detector configured to detect a position of an input operation performed on the operation surface;
a memory; and
a processor configured to execute
   applying a Fourier transform to a first image that includes brightness information, to obtain a first distribution of spatial frequencies of brightness of the first image,
   filtering the first distribution of the spatial frequencies of the brightness through a filter having a transmission band characteristic obtained by converting a transmission band characteristic in which a transmission degree of the brightness in a frequency band detectable by Pacini's corpuscles is reduced to a predetermined degree, into the transmission band characteristic in the spatial frequencies based on a coefficient depending on a display size of the first image and a predetermined speed of the input operation, to obtain a second distribution of the spatial frequencies of the brightness,
   applying an inverse Fourier transform to the second distribution of the spatial frequencies of the brightness, to obtain a second image, and
   driving the vibration element by a drive signal that has an amplitude according to brightness of the second image corresponding to a position of the input operation detected by the position detector.

4. The electronic device as claimed in claim 3, wherein the filtering includes a plurality of filters depending on a plurality of predetermined speeds of the input operation, through which the first distribution of the spatial frequencies of the brightness is filtered, to obtain a plurality of second distributions of the spatial frequencies of the brightness,
   wherein the applying the inverse Fourier transform applies the inverse Fourier transform to the plurality of the second distributions of the spatial frequencies of the brightness depending on the plurality of the predetermined speeds of the input operation, to obtain a plurality of second images, and
   wherein the driving drives the vibration element by the drive signal that has the amplitude according to the brightness of the second image, by using the second image selected from among the plurality of the second images depending on the plurality of the predetermined speeds of the input operation that corresponds to the predetermined speed of the input operation closest to a moving speed of the input operation detected by the position detector.

5. The electronic device as claimed in claim 1, wherein the driving estimates a position of the input operation after a predetermined period will have passed depending on a change rate in time of the position, and drives the vibration element by the drive signal that has the amplitude according to the brightness of the second image corresponding to a position located between the input operation currently performed and the estimated position of the input operation.

6. The electronic device as claimed in claim 1, wherein the drive signal is a drive signal to generate a natural vibration in an ultrasonic range on the operation surface, and
   wherein the driving drives the vibration element so as to change a strength of the natural vibration depending on the position of the input operation on the operation surface and a change rate in time of the position.

7. A drive control method of an electronic device that includes
a display;
a top panel placed on a display surface of the display, and including an operation surface;
a vibration element configured to generate a vibration on the operation surface;
a position detector configured to detect a position of an input operation performed on the operation surface;
a memory; and
a processor configured to execute
   applying a Fourier transform to a first image that includes brightness information, to obtain a first distribution of spatial frequencies of brightness of the first image,
   obtaining a second distribution of the spatial frequencies of the brightness by multiplying the first distribution of the spatial frequencies of the brightness by a coefficient depending on a display size of the first image,
   obtaining a first distribution of time frequencies of the brightness based on the second distribution of the spatial frequencies of the brightness, and a predetermined speed of the input operation,
   filtering the first distribution of the time frequencies of the brightness through a filter having a transmission band characteristic in which a transmission degree of the brightness in a frequency band detectable by Pacini's corpuscles is reduced to a predetermined degree, to obtain a second distribution of the time frequencies of the brightness,
   converting the second distribution of the time frequencies of the brightness into a third distribution of the spatial frequencies of the brightness, based on the coefficient and the predetermined speed,
   applying an inverse Fourier transform to the third distribution of the spatial frequencies of the brightness, to obtain a second image, and the drive control method comprising:
driving the vibration element by a drive
   signal that has an amplitude according to brightness of the second image corresponding to a position of the input operation detected by the position detector.

* * * * *